United States Patent
Mikami et al.

(10) Patent No.: US 7,715,033 B2
(45) Date of Patent: May 11, 2010

(54) COMPENSATING FOR CHANGED CAPABILITY INFORMATION

(75) Inventors: Ruriko Mikami, Kanagawa (JP); Akitoshi Yamada, Kanagawa (JP); Kentaro Yano, Kanagawa (JP); Takao Aichi, Tokyo (JP); Fumihiro Goto, Kanagawa (JP); Kazuyuki Masumoto, Kanagawa (JP); Hiromitsu Hirabayashi, Kanagawa (JP)

(73) Assignee: Canon Kabushiki Kaisha, Tokyo (JP)

( * ) Notice: Subject to any disclaimer, the term of this patent is extended or adjusted under 35 U.S.C. 154(b) by 1270 days.

(21) Appl. No.: 10/911,677

(22) Filed: Aug. 5, 2004

(65) Prior Publication Data

US 2005/0057772 A1    Mar. 17, 2005

(30) Foreign Application Priority Data

Aug. 8, 2003   (JP)   .............................. 2003-290599

(51) Int. Cl.
G06F 3/12      (2006.01)
H04N 5/225     (2006.01)
H04N 5/232     (2006.01)

(52) U.S. Cl. .............. 358/1.15; 348/207.2; 348/211.99; 348/211.1

(58) Field of Classification Search ................ 358/1.15; 348/207.2, 207.1, 211.99, 211.1
See application file for complete search history.

(56) References Cited

U.S. PATENT DOCUMENTS 6,104,886 A    8/2000  Suzuki et al. ............... 369/429

7,440,125 B2*  10/2008  Maekawa et al. ........... 358/1.15
2003/0081251 A1*  5/2003  Tanaka et al. ............... 358/1.15
2003/0110319 A1*  6/2003  Kim et al. ..................... 710/1

FOREIGN PATENT DOCUMENTS

JP       11-88744       3/1999

OTHER PUBLICATIONS

"White Paper of CIPA DC-001-2003 Digital Photo Solutions for Imaging Devices" by Camera & Imaging Products Association.*
"World's First PictBridge Compatible Inkjet Printer from Canon Makes Direct Printing Easy", Aug. 4, 2003, Business Wire, http://www.allbusiness.com/electronics/computer-equipment-computer-chips/5809770-1.html.*
Kruger, Jennifer Barr, "PictBridge offers consumers more printing freedom", Aug. 1, 2004, Photo Marketing, http://www.allbusiness.com/professional-scientific/professional-services-photographic/203319-1.html.*

(Continued)

*Primary Examiner*—Twyler L Haskins
*Assistant Examiner*—Fred Guillermety
(74) *Attorney, Agent, or Firm*—Fitzpatrick, Cella, Harper & Scinto

(57) ABSTRACT

When the function of a printer has been changed, the printer notifies a DSC of a change in printer function using a capabilityChanged tag. If the DSC does not return any inquiry about the capabilityChanged tag, the printer determines that the DSC has no function that supports the capabilityChanged tag. The printer executes disconnection and re-connection of USB to execute a communication procedure with the DSC from the beginning, thereby notifying the DSC of the latest capability information in the printer.

16 Claims, 31 Drawing Sheets

OTHER PUBLICATIONS

The Institute of Electrical and Electronics Engineering, IEEE 100 The Authoritative Dictionary of IEEE Standards Terms, Dec. 2000, IEEE Press, Seventh Edition, p. 10.*

Eran Steinberg, et al., "Picture Transfer Protocol for Digital Still Photography Devices, PIMA 15740:2000".

* cited by examiner

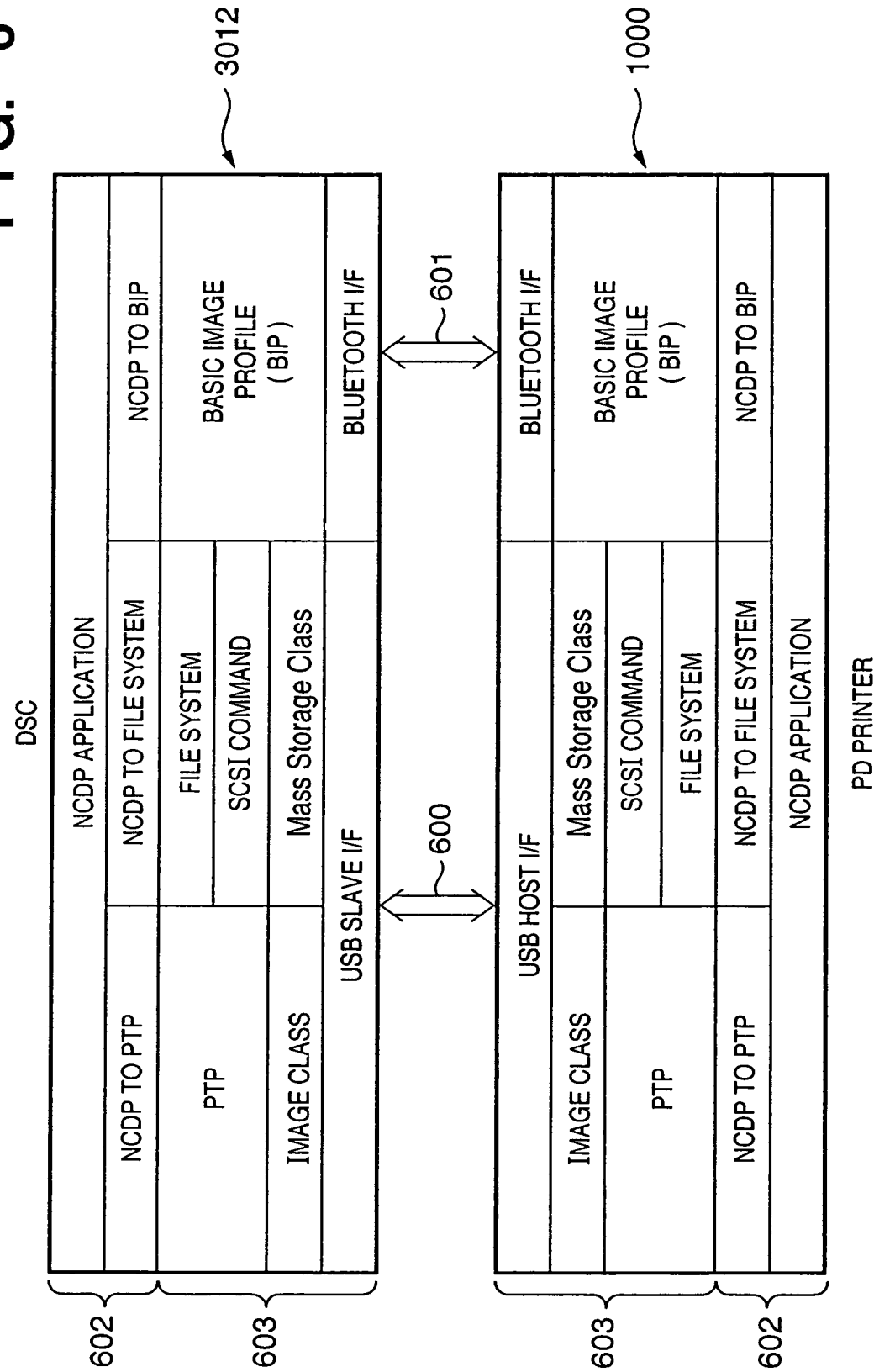

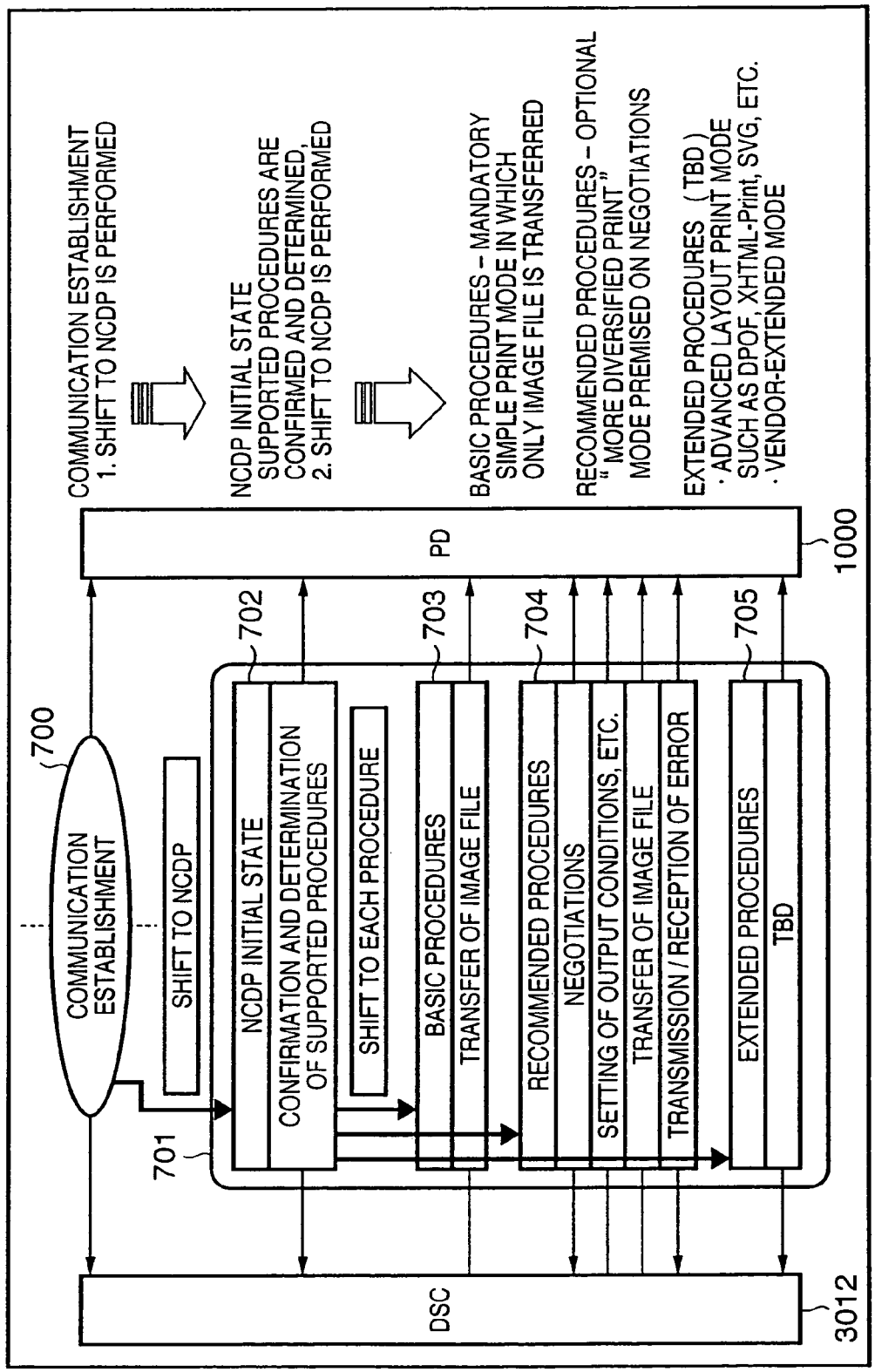

FIG. 8

| ISSUING SOURCE | FUNCTION NAME | CORRESPONDING MODE | | | FUNCTION |
|---|---|---|---|---|---|
| | | BASIC | RECOMMENDED | EXTENDED | |
| PRINTER | NCDPStart | ○ | ○ | ○ | SHIFT TO NCDP |
| | ProcedureStart | ○ | ○ | ○ | SHIFT TO EACH MODE (BASIC, RECOMMENDED, EXTENDED) |
| | NCDPEnd | ○ | ○ | ○ | TERMINATION FROM NCDP |
| | GetImage | ○ | ○ | | ACQUISITION OF IMAGE SUCH AS JPEG FROM DSC |
| | SendStatus | | ○ | | NOTIFICATION OF PRINTER STATUS |
| DSC | JobStart | ○ | ○ | | PRINT INSTRUCTION |
| | JobAbort | | ○ | | PRINT ABORT INSTRUCTION |
| | JobContinue | | ○ | | PRINT RESTART INSTRUCTION |
| | GetStatus | | ○ | | ACQUISITION OF PRINTER STATUS |
| | GetCapability | | ○ | | ACQUISITION OF PRINTER FUNCTION |

< Status >

<dpsPrintServiceStatus = Printing, Idle, Pause >
<Fatal>
<jobEndReason = notEnded, endedNormally, endedByJobAbort, endedByPrinterReason>
<disconectEnable = False, True>
<capabilityChanged = False, True>

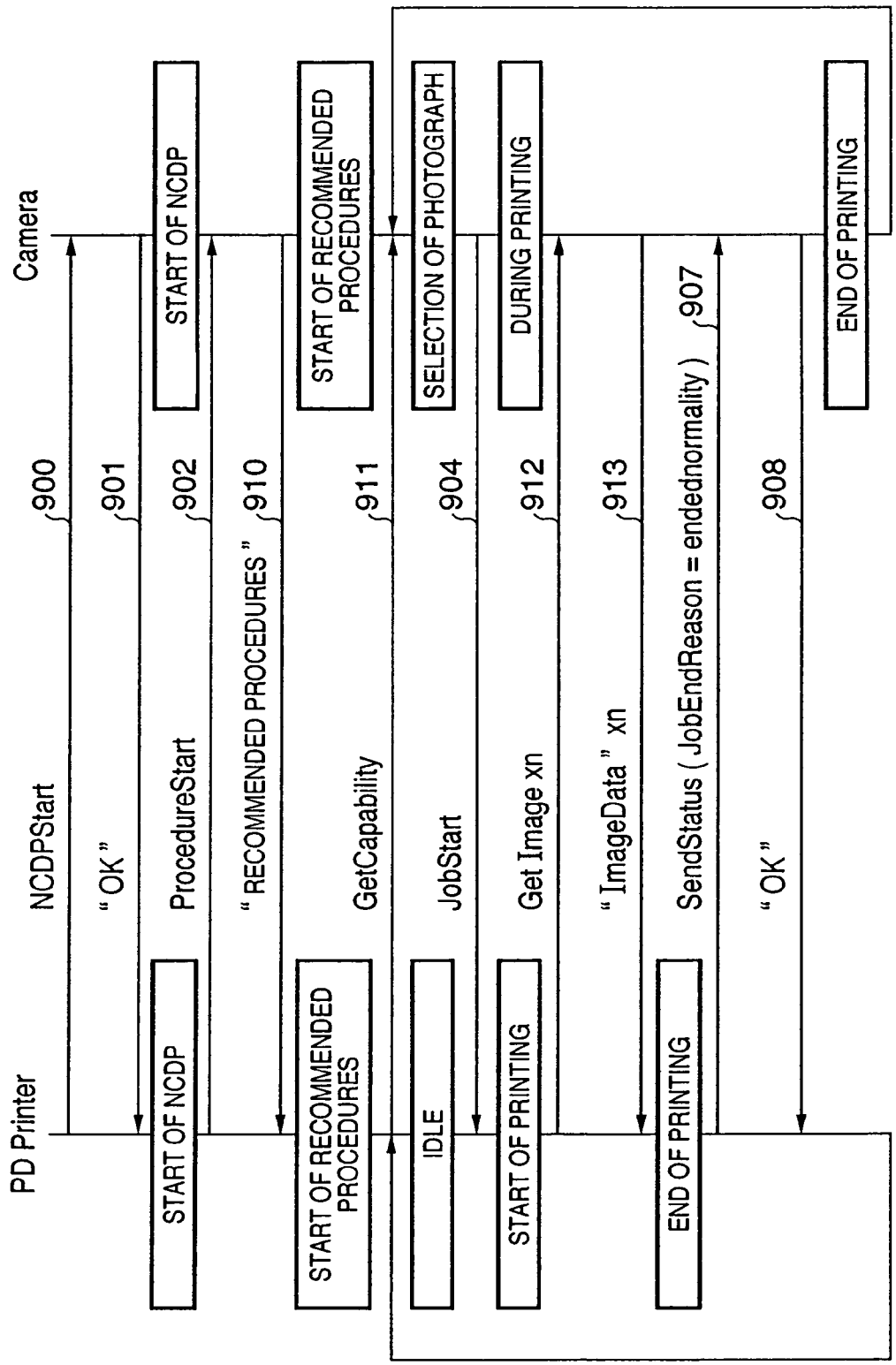

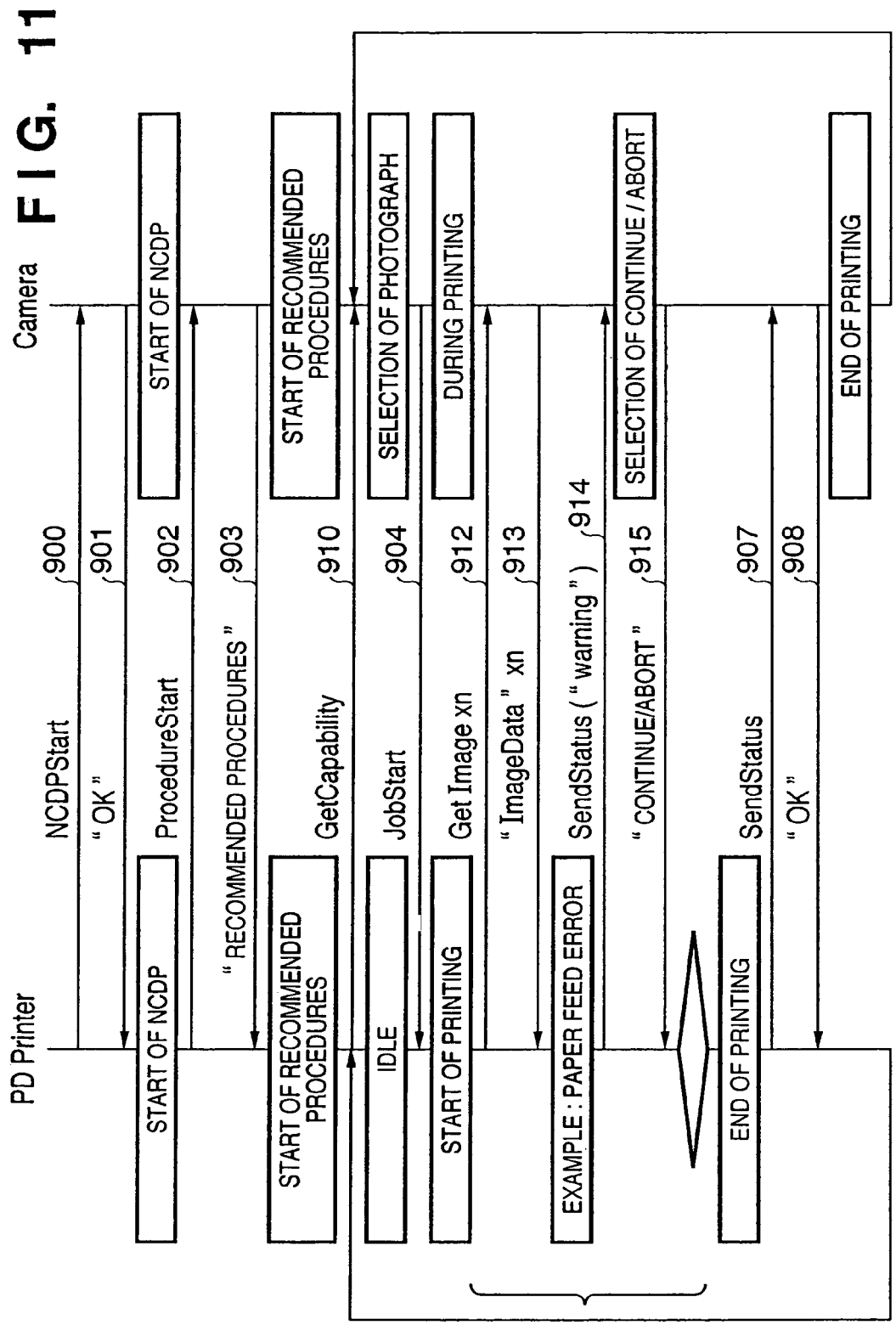

FIG. 12

| | DESCRIPTION OF CAPABILITY CONTENTS |
|---|---|
| `<CAPABILITY>` | |
| ITEMS WHICH DO NOT REQUIRE NEGOTIATIONS | |
| `<Quality=Draft, Normal, Fine>` | • OUTPUT QUALITY ( FAST / NORMAL / FINE ) |
| `<PaperSize=L, 2L,Card,Wallet, 4×6, A4, Letter, ...>` | • PAPER SIZE IS DESCRIBED |
| `<PaperType=Plain, Photo>` | • PAPER TYPE ( PLAIN PAPER / PHOTO-ONLY PAPER ) |
| ITEMS WHICH REQUIRE NEGOTIATIONS | |
| `<ImageType=Tiff, Jpeg, BMP, ...>` | • SUPPORTED IMAGE FORMAT INFORMATION IS DESCRIBED |
| `<Date=On, Off>` | • DATE OUTPUT ( ON / OFF ) |
| `<FileName = On, Off>` | • FILE NAME OUTPUT ( ON / OFF ) |
| `<Layout=PAPER SIZE / LAYOUT, ... ,INDEX(N×M)>` | • LAYOUT WHICH CAN BE OUTPUT FOR PAPER SIZE IS DESCRIBED |
| `<Layout=L / Borderless,1×1, 1×2, 2×2, INDEX(3×5)>` | |
| `<Layout=2L / Borderless,1×1, 1×2, 2×2, INDEX(5×7)>` | |
| `<Layout=Card / Borderless,1×1, 1×2, INDEX(2×3)>` | |
| ... | |
| `<Layout=Letter / Borderless,1×1, 1×2, 2×2, 2×4, 4×4, INDEX(8×10)>` | |
| `<ImageOptimize=On, Off>` | • IMAGE CORRECTION ( ON / OFF ) |
| `<SizePerPicture=3MByte>` | • IMAGE SIZE WHICH CAN BE OUTPUT |
| `<Option>` | • OPTION IS DESCRIBED |
| `<Vender=Ganon, HP, SQNY, ...>` | • VENDOR NAME |
| `<ImageOptimize=DiPS, Auto, On, APP, Vivid, Off, ...>` | • VENDOR-UNIQUE SPECIFICATION ( IMAGE CORRECTION ) |
| `<Trimming=(X, Y, W, H)>` | • VENDOR-UNIQUE SPECIFICATION ( TRIMMING ) |
| ... | |
| `</Option>` | |
| `</CAPABILITY>` | |

COMPENSATING FOR CHANGED CAPABILITY INFORMATION

FIELD OF THE INVENTION

The present invention relates to a recording system having an image supply device such as a digital camera or the like, and a recording device, and a control method thereof, and an image supply device, a recording device, and a control method thereof.

BACKGROUND OF THE INVENTION

In recent years, digital cameras (image sensing devices) which can sense an image and can convert the sensed image into digital image data by a simple operation have been popularly used. When an image sensed by such camera is printed and is used as a photograph, it is a common practice to temporarily download the sensed digital image data from a digital camera to a PC (computer), to execute an image process by that PC, and to output the processed image data from the PC to a color printer, thus printing an image.

By contrast, a color print system which allows a digital camera to directly transfer digital image data to a color printer without the intervention of any PC and can print it out (to be referred to as a direct print process hereinafter), a so-called photo-direct (PD) printer which can mount a memory card, which is mounted on a digital camera and stores sensed images, and can read and print sensed images stored in the memory card, and the like have recently been developed.

Such direct print process is originally a model-dependent print function that can be implemented between a camera and printer of an identical manufacturer. However, in recent years, the standardization in these industries has been made, and an environment that allows a direct print process by connecting a camera and printer of different manufacturers irrespective of manufacturers has been created.

Such printer device may receive and print image data from various devices such as a portable phone, PDA, and the like in addition to the aforementioned digital camera. Also, the printer itself has various functions, and exchanges function information with such devices.

However, such function information often includes those which cannot be exchanged between these devices. For example, when a partner device does not consider a given function at all, it cannot interpret such function information even if such information is transmitted. In such case, the device that has transmitted the function information cannot determine whether the partner device does not support the function, or no response returns due to a communication error or the like. For this reason, when such problem has occurred, each device may transfer image data and issue a print instruction while it cannot be determined whether or not the partner device supports the function.

In this case, for example, the contents of a UI displayed on a camera which requests printing by sending image data become different from the functions of a printer as the partner device in practice, and the user of the camera who wishes the printing cannot obtain a print result he or she intended, resulting in confusion. In such case, the camera may give a print instruction to the printer, by using a print function in which the printer does not have, and as the result, a print result that the user did not intend is obtained.

SUMMARY OF THE INVENTION

The present invention has been made in consideration of the above prior art, and has as its feature to provide a recording device, image supply device, recording system, and control method thereof, which determine whether or not a predetermined function is supported, and execute a process based on the determination result, in a case where it is unknown whether or not the image supply device and recording device support specific function information.

According to an aspect of the present invention, there is provided with a recording apparatus used in a communication system in which an image supply device and a recording apparatus communicate with each other using a predetermined protocol, the apparatus by comprising: reception means for receiving function information of the image supply device after a communication procedure is established by applications which are installed in the recording apparatus and the image supply device and use the predetermined protocol; estimation means for estimating the presence/absence of support of a predetermined function, which is not described in the function information, by the image supply device in accordance with communication contents in the communication procedure; and control means for executing a process on the basis of the presence/absence of support of the predetermined function estimated by the estimation means.

According to an aspect of the present invention, there is provided with an image supply device used in a communication system in which an image supply device and a recording apparatus communicate with each other using a predetermined protocol, the device by comprising: reception means for receiving function information of the recording apparatus after a communication procedure is established by applications which are installed in the recording apparatus and the image supply device and use the predetermined protocol; estimation means for estimating the presence/absence of support of a predetermined function, which is not described in the function information, by the recording apparatus in accordance with communication contents in the communication procedure; and control means for executing a process on the basis of the presence/absence of support of the predetermined function estimated by the estimation means.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate embodiments of the invention and, together with the descriptions, serve to explain the principle of the invention.

FIG. 6 depicts a view for explaining the software configurations of the PD printer and digital camera, which incorporate NCDP according to the embodiment of the present invention;

FIG. 7 depicts a view for explaining an overview of NCDP communication procedures according to the embodiment of the present invention;

FIG. 8 depicts a view for explaining commands in NCDP according to the embodiment of the present invention;

FIG. 10 is a chart for explaining a print sequence based on "recommended procedure" in NCDP according to the embodiment of the present invention;

FIG. 11 is a chart for explaining a print sequence upon occurrence of an error in "recommended procedure" in NCDP according to the embodiment of the present invention;

FIG. 12 depicts a view for explaining an example of Capability data transmitted in NCDP according to the embodiment of the present invention;

DESCRIPTION OF THE PREFERRED EMBODIMENTS

Preferred embodiments of the present invention will now be described in detail in accordance with the accompanying drawings.

Figure 1:
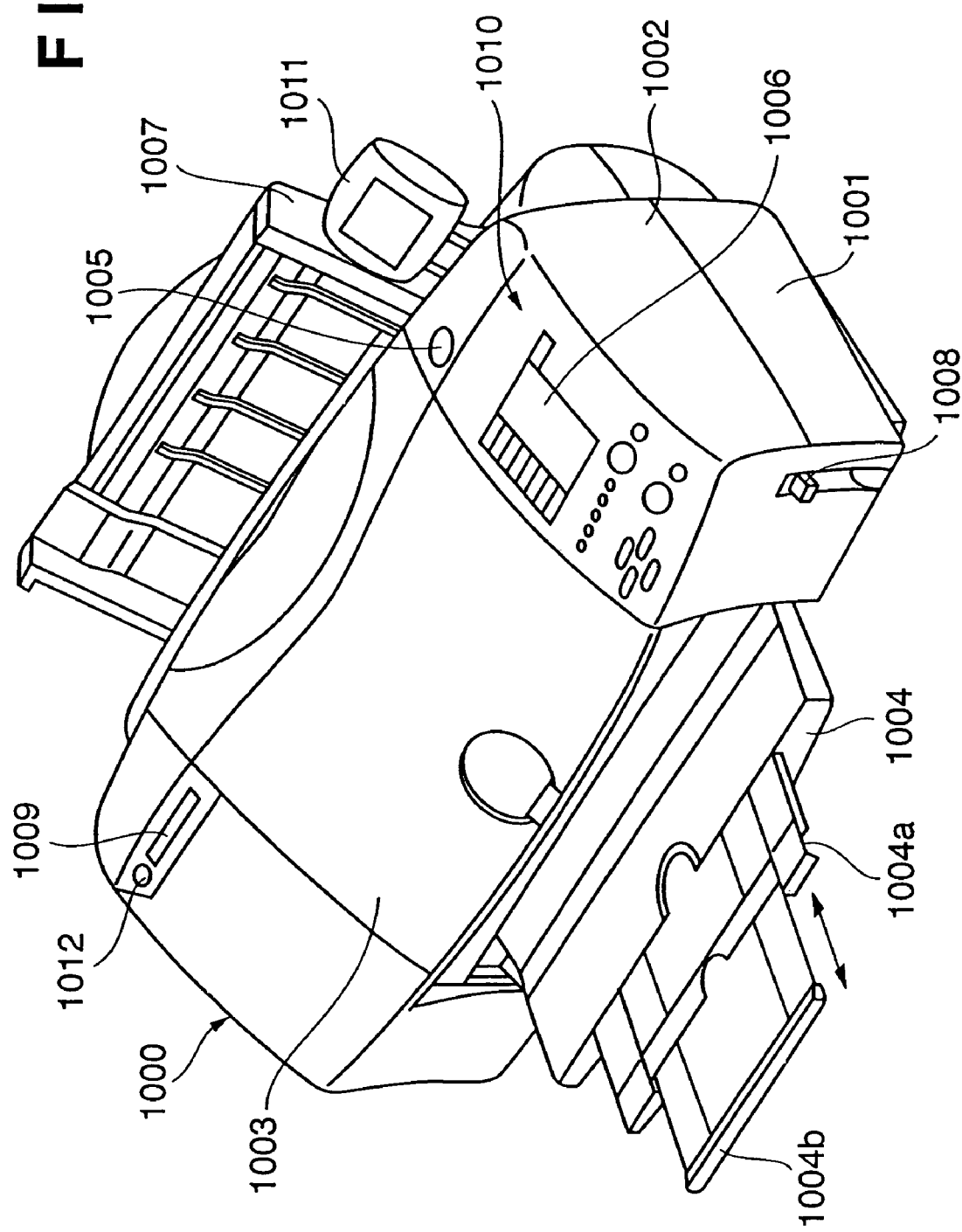
FIG. 1 depicts a schematic perspective view of a PD printer according to an embodiment of the present invention.

FIG. 1 depicts a schematic perspective view of a photo-direct printer device (to be referred to as a PD printer hereinafter) 1000 according to an embodiment of the present invention. This PD printer 1000 has a function of printing data received from a host computer (PC) as a normal PC printer, and a function of printing image data directly read from a storage medium such as a memory card or the like, and printing image data received from a digital camera, PDA, or the like.

Referring to FIG. 1, a main body which forms a housing of the PD printer 1000 according to this embodiment has a lower case 1001, upper case 1002, access cover 1003, and exhaust tray 1004 as exterior members. The lower case 1001 nearly forms the lower half portion of the PD printer 1000, and the upper case 1002 nearly forms the upper half portion of the main body. By combining these cases, a hollow structure which has a storage space that stores mechanisms to be described later is formed. Openings are respectively formed on the upper and front surfaces of the main body. One end portion of the exhaust tray 1004 is rotatably held by the lower case 1001, and rotation of the tray 1004 opens/closes the opening formed on the front surface of the lower case 1001. Hence, upon making the printer execute a print operation, the exhaust tray 1004 is rotated toward the front surface side to open the opening, so that printed sheets (including plain paper, dedicated paper, resin sheet, and the like; to be simply referred to as a sheet hereinafter) can be discharged from the opening. The discharged print sheets are stacked on the exhaust tray 1004 in turn. The exhaust tray 1004 stores two auxiliary trays 1004a and 1004b. When these auxiliary trays are pulled out as needed, the loading area of sheets can be enlarged/reduced in three steps.

One end portion of the access cover 1003 is rotatably held by the upper case 1002 to be able to open/close the opening formed on the upper surface of the main body. When the access cover 1003 is opened, a printhead cartridge (not shown), ink tanks (not shown), or the like housed in the main body can be exchanged. Although not shown, when the access cover 1003 is opened/closed, a projection formed on the rear surface of the cover 1003 rotates a cover open/close lever. By detecting the rotation position of that lever using a microswitch or the like, the open/close state of the access cover 1003 is detected.

A power key 1005 is arranged on the upper surface of the upper case 1002. A control panel 1010 which comprises a liquid crystal display 1006, various key switches, and the like is provided on the right side of the upper case 1002. The structure of the control panel 1010 will be described in detail later with reference to FIG. 2. Reference numeral 1007 denotes an automatic feeder which automatically feeds a sheet into the device main body. Reference numeral 1008 denotes a paper gap select lever which is used to adjust the gap between the printhead and sheet. Reference numeral 1009 denotes a card slot which receives an adapter that can receive a memory card. Via this adapter, image data stored in the memory card can be directly taken and printed. As this memory card (PC), for example, a Compact Flash® memory card, smart media card, memory stick, and the like are available. Reference numeral 1011 denotes a viewer (liquid crystal display unit) which is detachable from the main body of this PD printer 1000, and is used to display an image for one frame, index images, and the like, when the user wishes to search images stored in the PC card for an image to be printed. Reference numeral 1012 denotes a USB terminal used to connect a digital camera (to be described later). Also, another USB connector used to connect a personal computer (PC) is provided on the rear surface of this PD printer 1000.

<Overview of Printer Console>

Figure 2:
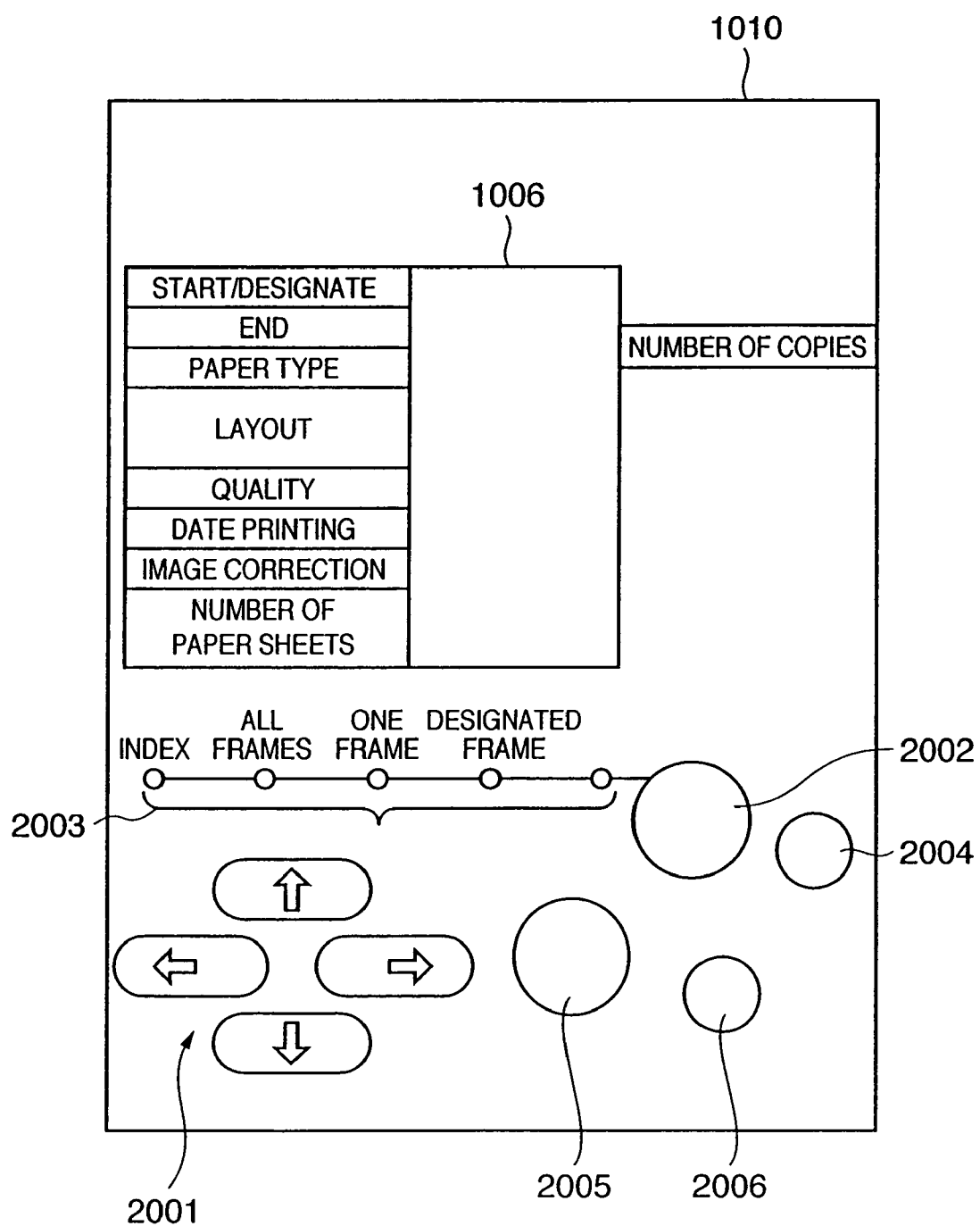
FIG. 2 depicts a schematic view of a control panel of the PD printer according to the embodiment of the present invention.

FIG. 2 depicts a schematic view of the control panel 1010 of the PD printer 1000 according to this embodiment.

Referring to FIG. 2, the liquid crystal display unit 1006 displays menu items used to make various setups of data associated with item names printed on the right and left sides of the unit 1006. The items printed here include, e.g., the first photograph number of a photograph image to be printed of a plurality of photograph image files or designated frame number (start frame designation/print frame designation), the last photograph number of a photograph image to be printed at the end of a print process (end), the number of prints (number of copies), the type of sheet used in a print process (paper type), the setup of the number of photographs to be printed per sheet (layout), designation of print quality (quality), designation as to whether or not to print a photographing date (date printing), designation as to whether or not to print a photograph after correction (image correction), display of the number of sheets required for the print process (number of sheets), and the like. These items are selected or designated using cursor keys 2001. Reference numeral 2002 denotes a mode key. Every time this key is pressed, a print mode (index print, all-frame print, one-frame print, designated-frame print, and the like) can be switched, and a corresponding one of LEDs 2003 is turned on in accordance with the selected print mode. Reference numeral 2004 denotes a maintenance key which is used to do maintenance of the printer (e.g., cleaning of the printhead, and the like). Reference numeral 2005 denotes a print start key which is pressed when the start of a print process is instructed or when the maintenance setup is settled. Reference numeral 2006 denotes a print cancel key which is pressed when a print process or maintenance is canceled.

<Overview of Printer Electric Specification>

The arrangement of principal part associated with the control of the PD printer 1000 according to this embodiment will be described below with reference to FIG. 3. Note that the same reference numerals in FIG. 3 denote parts common to those in the above drawings, and a description thereof will be omitted.

Figure 3:
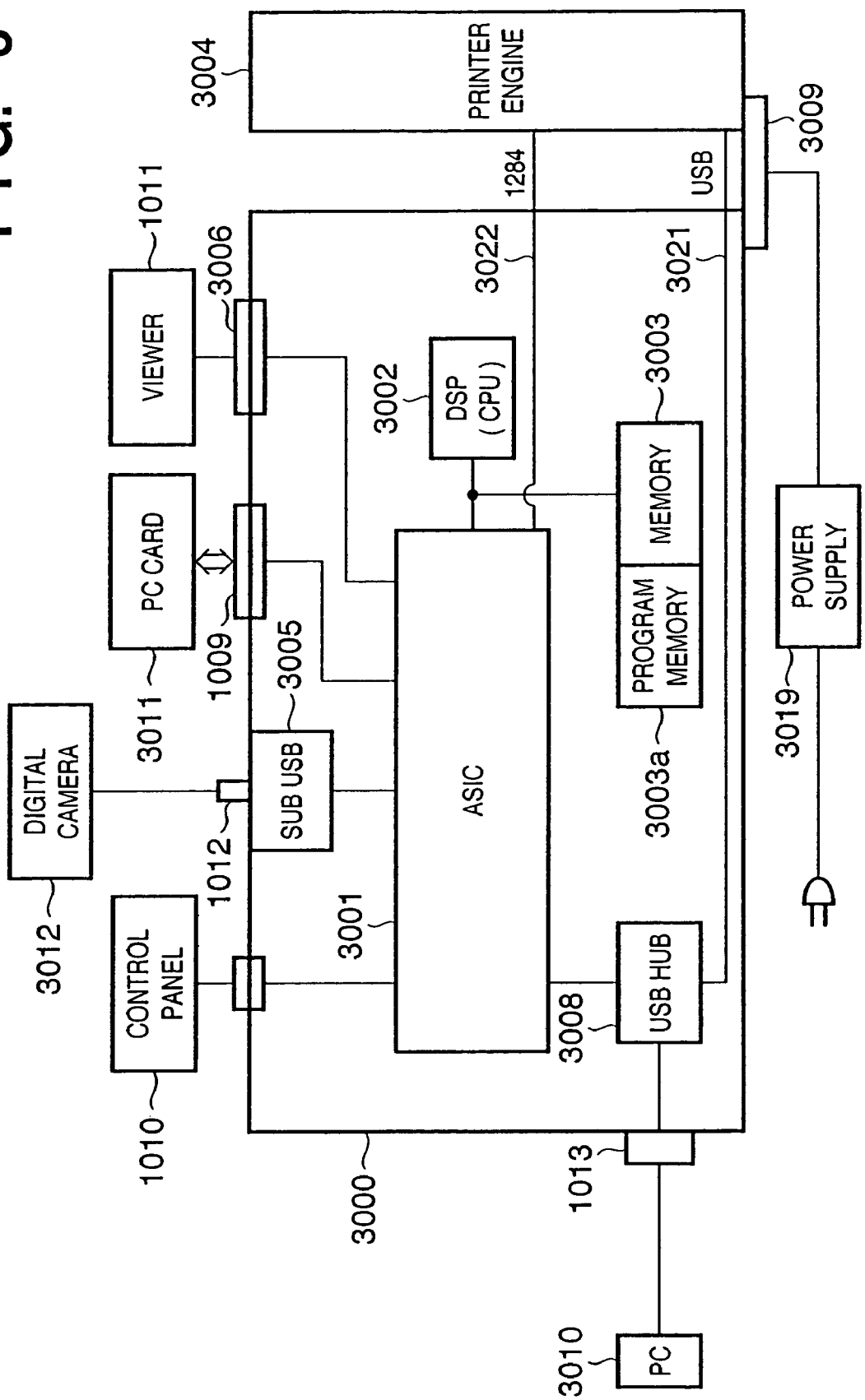
FIG. 3 is a block diagram showing the arrangement of principal part associated with control of the PD printer according to the embodiment of the present invention.

Referring to FIG. 3, reference numeral 3000 denotes a controller (control board). Reference numeral 3001 denotes an ASIC (application specific LSI). Reference numeral 3002 denotes a DSP (digital signal processor), which includes a CPU and executes various control processes to be described later, and image processes such as conversion from a luminance signal (RGB) into a density signal (CMYK), scaling, gamma conversion, error diffusion, and the like. Reference numeral 3003 denotes a memory, which has a program memory 3003a for storing a control program to be executed by the CPU of the DSP 3002, a RAM area for storing a running program, and a memory area that serves as a work area for storing image data and the like. Reference numeral 3004 denotes a printer engine. In this embodiment, the printer is equipped with a printer engine of an ink-jet printer which prints a color image using a plurality of color inks. Reference numeral 3005 denotes a USB connector as a port for connecting a digital camera (DSC) 3012. Reference numeral 3006 denotes a connector for connecting the viewer 1011. Reference numeral 3008 denotes a USB hub (USB HUB). When the PD printer 1000 executes a print process based on image data from a PC 3010, the USB hub 3008 allows data received from the PC 3010 to pass through it, and outputs the data to the printer engine 3004 via a USB 3021. In this way, the PC 3010 connected to the printer can execute a print process by directly exchanging data, signals, and the like with the printer engine 3004 (the printer serves as a normal PC printer). Reference numeral 3009 denotes a power supply connector, which inputs a DC voltage which is converted from commercial AC power by a power supply 3011. The PC 3010 is a general personal computer. Reference numeral 3011 denotes a memory card (PC card) mentioned above; and numeral 3012 denotes a digital camera (DSC: Digital Still Camera).

Note that signals are exchanged between this controller 3000 and printer engine 3004 via the aforementioned USB 3021 or an IEEE1284 bus 3022.

Figure 4:
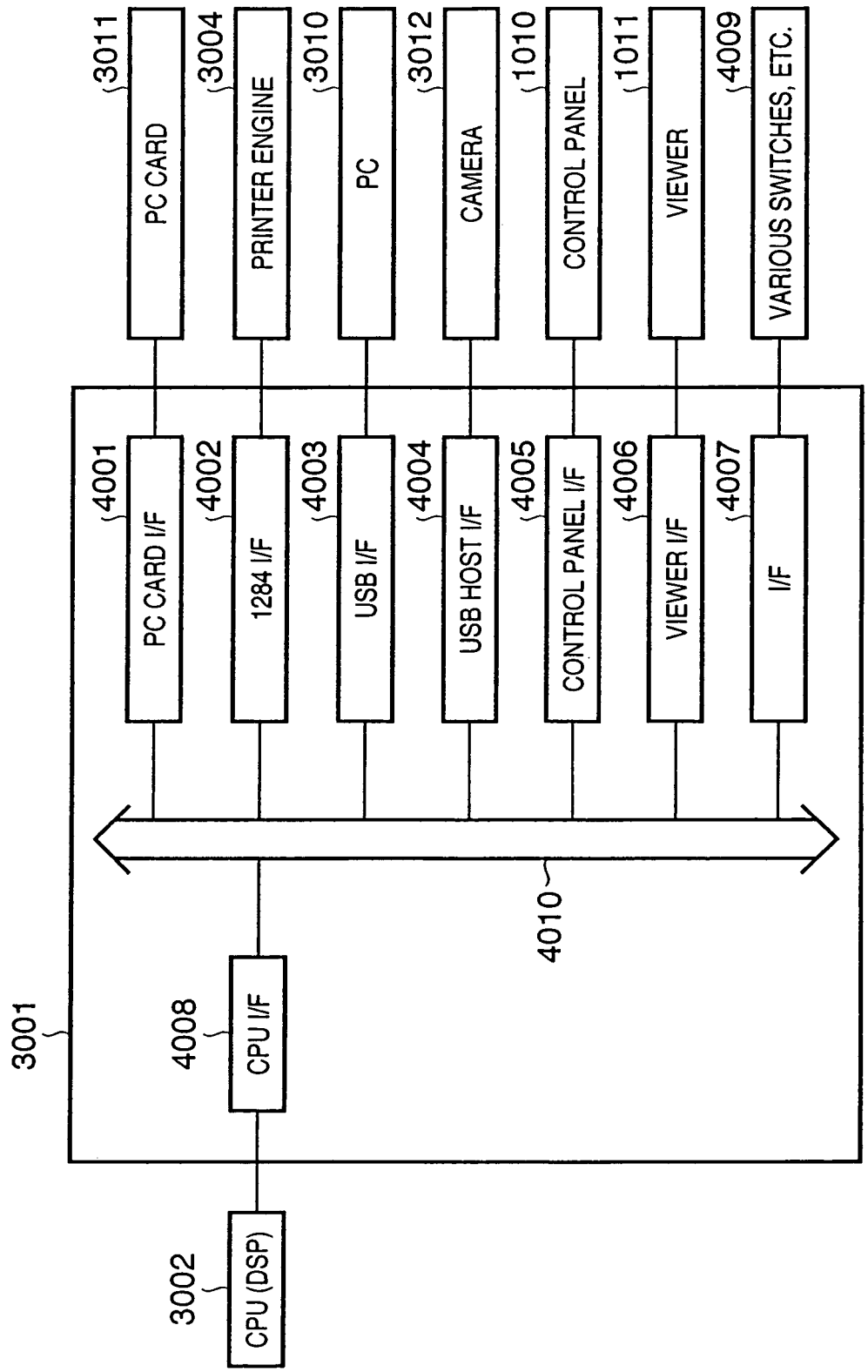
FIG. 4 is a block diagram showing the arrangement of an ASIC of the PD printer according to the embodiment of the present invention.

FIG. 4 is a block diagram showing the arrangement of the ASIC 3001. In FIG. 4 as well, the same reference numerals denote parts common to those in the above drawings, and a description thereof will be omitted.

Reference numeral 4001 denotes a PC card interface, which reads image data stored in the inserted PC card 3011, or writes data in the PC card 3011. Reference numeral 4002 denotes an IEEE 1284 interface, which exchanges data with the printer engine 3004. This IEEE1284 interface 4002 is a bus used when image data stored in the digital camera 3012 or PC card 3011 is to be printed. Reference numeral 4003 denotes a USB interface, which exchanges data with the PC 3010. Reference numeral 4004 denotes a USB host interface, which exchanges data with the digital camera 3012. Reference numeral 4005 denotes a control panel interface, which receives various operation signals from the control panel 1010, and outputs display data to the display unit 1006. Reference numeral 4006 denotes a viewer interface, which controls display of image data on the viewer 1011. Reference numeral 4007 denotes an interface, which controls interfaces with various switches, LEDs 4009, and the like. Reference numeral 4008 denotes a CPU interface, which controls data exchange with the DSP 3002. Reference numeral 4010 denotes an internal bus (ASIC bus), which interconnects these interfaces.

An overview of the operation based on the above arrangement will be explained below.

<Normal PC Printer Mode>

This mode is a print mode for printing an image on the basis of print data sent from the PC 3010.

In this mode, when data from the PC 3010 is input via the USB connector 1013 (FIG. 3), it is directly sent to the printer engine 3004 via the USB hub 3008 and USB 3021, and a print process is executed based on the data from the PC 3010.

<Direct Print Mode from PC Card>

When the PC card 3011 is attached to or detached from the card slot 1009, an interrupt is generated, and the DSP 3002 can detect based on this interrupt whether or not the PC card 3011 is attached or detached (removed). When the PC card 3011 is attached, compressed image data (e.g., compressed by JPEG) stored in that PC card 3011 is read out and stored in the memory 3003. If the user issues a print instruction of the stored image data using the control panel 1010, the compressed image data is decompressed, and is stored in the memory 3003. The image data is converted into print data that can be printed by the printer engine 3004 by executing conversion from RGB signals into YMCK signals, gamma correction, error diffusion, and the like, and the print data is output to the printer engine 3004 via the IEEE 1284 interface 4002, thus printing an image.

<Overview of Camera/Printer Connection>

Figure 5:
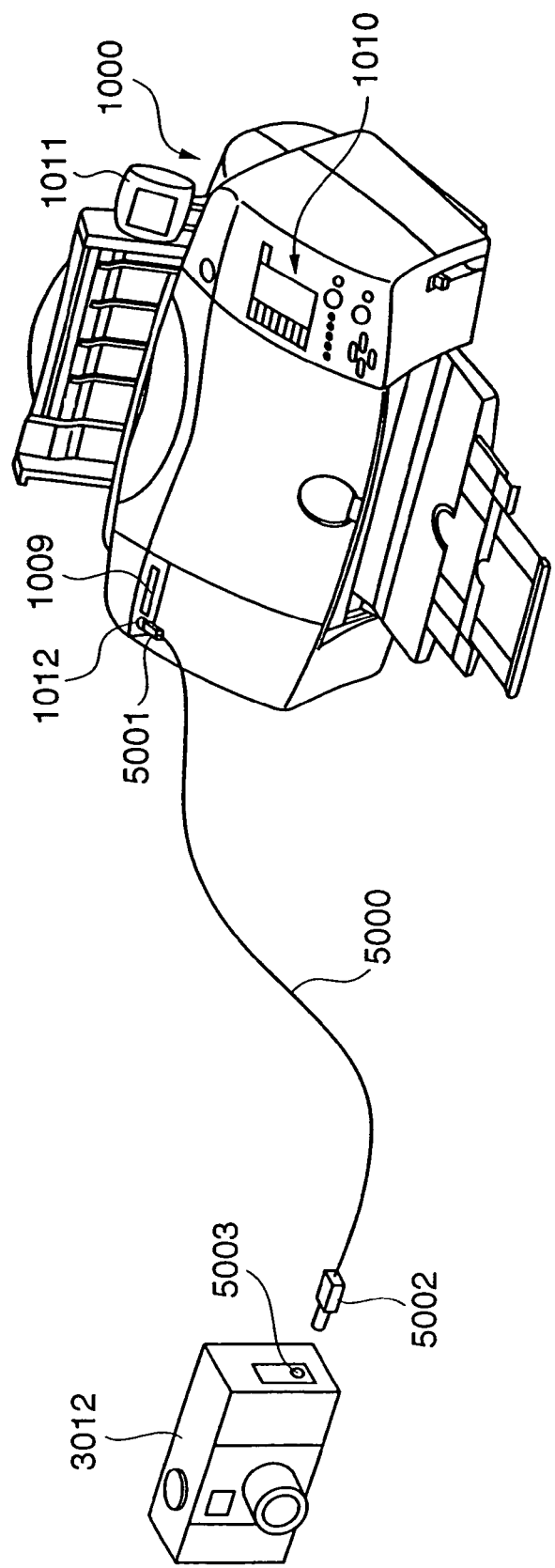
FIG. 5 depicts a view for explaining connection of the PD printer and a digital camera according to the embodiment of the present invention.

FIG. 5 depicts a view for explaining connection of the PD printer 1000 and digital camera 3012 according to the first embodiment. The same reference numerals in FIG. 5 denote parts common to those in the above drawings, and a description thereof will be omitted.

Referring to FIG. 5, a cable 5000 comprises a connector 5001 which is connected to the connector 1012 of the PD printer 1000, and a connector 5002 which is connected to a connector 5003 of the digital camera 3012. The digital camera 3012 can output image data saved in its internal memory via the connector 5003. Note that the digital camera 3012 can adopt various arrangements, e.g., an arrangement that comprises an internal memory as storage means, an arrangement that comprises a slot for receiving a detachable memory, and so forth. When the PD printer 1000 and digital camera 3012 are connected via the cable 5000 shown in FIG. 5, image data output from the digital camera 3012 can be directly printed by the PD printer 1000.

An object of this embodiment is to provide a PD printer which can connect digital cameras of a plurality of vendors and can print data. Protocols required upon executing a print process by connecting the PD printer 1000 according to this embodiment and a digital camera will be described in detail hereinafter.

This embodiment proposes NCDP (New Camera Direct Print) which makes communication control between the PD printer and digital camera using a general-purpose file and general-purpose format, and is independent from interfaces.

FIG. 6 depicts an example of the configuration of this NCDP.

Referring to FIG. 6, reference numeral 600 denotes a USB interface; and numeral 601 denotes a Bluetooth interface. Reference numeral 602 denotes an application layer which is built in upon forming an NCDP system. Reference numeral 603 denotes a layer that implements existing protocols and interfaces. In FIG. 6, PTP (Picture Transfer Protocol), SCSI, BIP (Basic Image Profile) of Bluetooth, and the like are installed. NCDP according to this embodiment is premised on that an architecture such as a protocol layer and the like is adopted, and NCDP is supported as an application on the architecture. In this case, the PD printer 1000 and digital camera 3012 are respectively defined as USB host and USB slave; they have the same NCDP configurations, as shown in FIG. 6.

FIG. 7 depicts a view for explaining the flow of communication procedures between the PD printer 1000 and DSC 3012 on the basis of NCDP according to this embodiment.

In this case, when it is detected that the PD printer 1000 and DSC 3012 have been connected via the USB cable 5000, as shown in FIG. 5, these devices can communicate with each other. As a result, applications installed in these devices are executed to start shift to NCDP procedure 701. Reference numeral 702 denotes an NCDP initial state. In this state, it is determined whether or not each other's models can implement NCDP. If NCDP can be implemented, the flow advances to the NCDP procedure 701. If the DSC 3012 does not support NCDP, no NCDP communication control is executed. If the DSC 3012 issues a transfer/print instruction of image data based on "basic procedures" after shift to the NCDP, as indicated by 703, the flow shifts to a simple print mode in which an image file is transferred from the DSC 3012 to the PD printer 1000, and is printed. On the other hand, if the DSC 3012 issues a transfer/print instruction of image data based on "recommended procedures", as indicated by 704, the flow advances to a print mode corresponding to diversified functions, in which the DSC 3012 and PD printer 1000 make various negotiations to determine the print condition and the like, an image file is transferred from the DSC 3012 to the PD printer 1000, and the transferred image file is printed. Furthermore, reference numeral 705 denotes "extended procedures". If the DSC 3012 issues this "extended procedures" instruction, a mode that executes a print process using an advanced layout function such as DPOF, XHTML-print, SVG, or the like and specifications unique to each vendor is set. Note that the detailed specifications based on the "extended procedures" are specified in the specifications of each individual DSC vendor, and a description thereof will be omitted. Note that the image print processes based on these "basic procedures" and "recommended procedures" will be described later with reference to FIGS. 9 to 11.

FIG. 8 depicts a view for explaining commands which are defined to print in NCDP according to this embodiment.

Referring to FIG. 8, "corresponding mode" corresponds to the above "basic procedures", "recommended procedures", and "extended procedures" designated by the DSC 3012. In the "recommended procedures", all commands can be used. However, since the "basic procedures" correspond to a simple print mode, only a shift to NCDP command and an NCDP end command, shift commands to the modes of the "basic procedures", the "recommended procedures", and the "extended procedures", an acquisition command of image data from the camera 3012, and a print command from the camera 3012 can be used. In the "extended procedures", only a shift to NCDP command and an NCDP end command, and shift command to the modes of "basic procedures", the "recommended procedures", and the "extended procedures" are allowed to be used in FIG. 8. However, as described above, other commands may be used in accordance with the specifications of respective vendors.

The image print processes based on the above "basic procedures" and "extended procedures" will be explained below.

Figure 9:
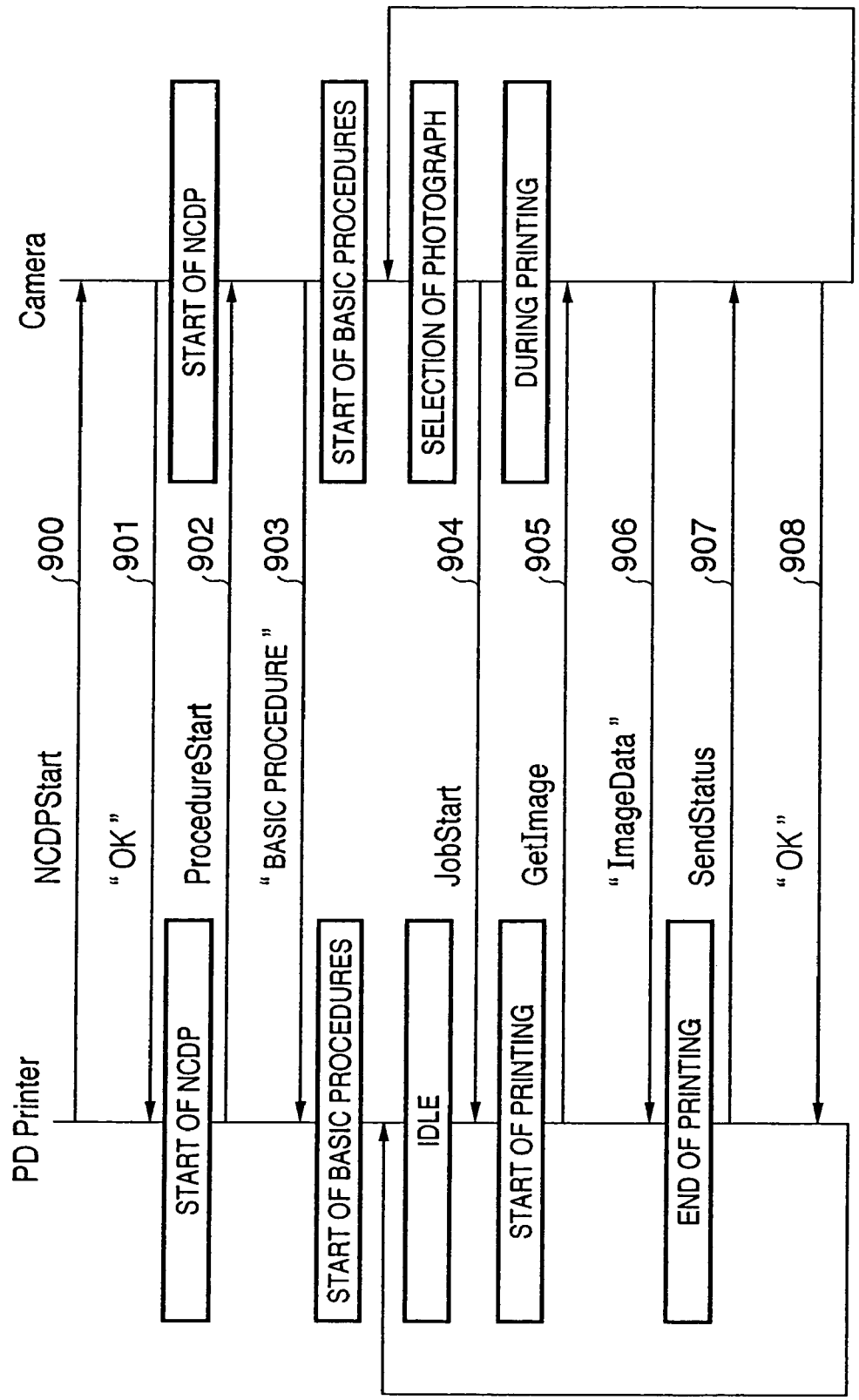
FIG. 9 is a chart for explaining a print sequence based on "basic procedure" in NCDP according to the embodiment of the present invention.

FIG. 9 is a chart for explaining the NCDP communication procedures in a case where an image print process is executed based on the "basic procedures". This "basic procedures" correspond to a simple print mode in which one image file is transferred from the DSC 3012 to the PD printer 1000 and is printed. Compatible image formats include an RGB image of the VGA size (640×480 pixels) and a JPEG image of the VGA size (640×480 pixels). The image file size is about 1 Mbytes or less. The DSC 3012 transmits an image file in an image format supported by the PD printer 1000. In this case, no error handling is executed.

The PD printer 1000 sends a command (NCDPStart) indicating shift to NCDP to the DSC 3012 (900). If the DSC 3012 supports NCDP, it replies "OK" (901). Note that a practical example of the NCDP confirmation procedures using PTP will be explained in detail later with reference to FIG. 14.

If the PD printer 1000 and DSC 3012 confirm each other that they support NCDP, the PD printer 1000 transmits to the DSC 3012 an instruction (ProcedureStart) for shifting to the NCDP mode (902). In response to this command, when the DSC 3012 transmits "basic procedures" as a simple print mode (903), the control shifts to a print mode based on the "basic procedures". In this case, when an image to be printed is selected and its print instruction is issued upon operation on the DSC 3012, a command (JobStart) indicating the start of a print job is sent from the DSC 3012 to the PD printer 1000 (904). In response to this command, the PD printer 1000 is set in the simple print mode, and sends a command (GetImage) to the DSC 3012 to request it to send a JPEG image (905). Then, the DSC 3012 sends a JPEG image to the PD printer 1000 (906), and a print process in the PD printer 1000 starts. Upon completion of the print process of the designated image, the PD printer 1000 sends a command (JobEnd) indicating the end of the print job to the DSC 3012 (907). When the DSC 3012 returns an acknowledgement (OK) in response to this command (908), the print process based on the "basic procedures" ends. Note that it is determined whether or not exchange is made in the "basic procedures", based on Capability data of both the DSC and PD printer.

FIG. 10 is a chart for explaining the NCDP communication procedures when an image print process is executed based on the "recommended procedures". The same reference numerals in FIG. 10 denote procedures common to those in FIG. 9, and a description thereof will be omitted. In the "recommended procedures", a "more diversified print" mode premised on negotiation between the PD printer 1000 and DSC 3012 can be set, and photo print and layout print processes of a plurality of images can be made. Also, error handling can be executed.

In FIG. 10, after the PD printer 1000 and DSC 3012 confirm each other as in FIG. 9 that they support NCDP, the DSC 3012 designates the "recommended procedures" (910) in this case. After that, procedures based on the "recommended procedures" are executed. In response to a Capability request from the DSC 3012 to the PD printer 1000, the PD printer 1000 notifies the DSC 3012 of its all functions and those including a paper setup and the like as Capability information (911). This Capability information is transmitted to the DSC 3012 in a script format (text).

FIG. 12 depicts an example of this Capability information.

As shown in FIG. 12, this Capability information includes information of the printable paper types and sizes, print quality, image data format, date print (ON/OFF), file name print (ON/OFF), layout, and image correction (ON/OFF), and also information of the availability of functions corresponding to the specification of each camera vendor and the like as options.

Script notation of the Capability information facilitates export to architectures of other communication protocols and standardization of exchange of such function information. Note that this notation may comply with XML.

The user of the DSC 3012 that has received such Capability information determines which of the functions of the PD printer 1000 is to be used in a print process, selects an image to be printed, and selects and determines the print conditions of that image from the functions of the PD printer 1000. After the user determines the image to be printed, its print condition, and the like, and designates the start of a print process, a print instruction (JobStart) is sent to the PD printer 1000. The PD printer 1000 then issues a command (GetImage xn) that requests the image data (912), and the DSC 3012 transmits the corresponding image data in an image format (Tiff, JPEG, RGB, or the like) that can be received by the PD printer 1000 (913). The reason why a plurality of image data can be transmitted for an image print process per one paper sheet is that in a case where, for example, a 2×2 layout print mode or the like is designated, four image data can be transmitted per one paper sheet. Upon completion of the print process of the designated image, the PD printer 1000 transmits a command (JobEnd) indicating the end of the print job to the DSC 3012 (907). In this case, "endnormaly" indicating normal end is transmitted. When the DSC 3012 returns an acknowledgement (OK) in response to the information (908), the control starts the select and print processes of the next image based on the "recommended procedures" again.

FIG. 11 is a chart for explaining the communication procedures in a case where an error has occurred in the PD printer 1000 in the NCDP communication procedures upon executing an image print process based on the above "recommended procedures". The same reference numerals in FIG. 11 denote procedures common to those in FIG. 10, and a description thereof will be omitted.

FIG. 11 exemplifies a case wherein a paper feed error has occurred in the PD printer 1000 during the print process based on the "recommended procedures". In this case, the PD printer 1000 sends status information (SendStatus"Warning") indicating the paper feed error to the DSC 3012 (914). In response to this information, a command indicating if that print process is to be continued (JobContinue) or aborted (JobAbort) is transmitted to the PD printer 1000 on the basis of the decision by the user of the DSC 3012 (915). If "abort" is designated, the PD printer 1000 aborts that print process, and transmits a print job end message (JobEnd). On the other hand, if "continue" is designated, the apparatus continues the print process after that paper feed error has been recovered.

The aforementioned processing sequence will be explained below with reference to the flowchart of FIG. 13.

Figure 13:
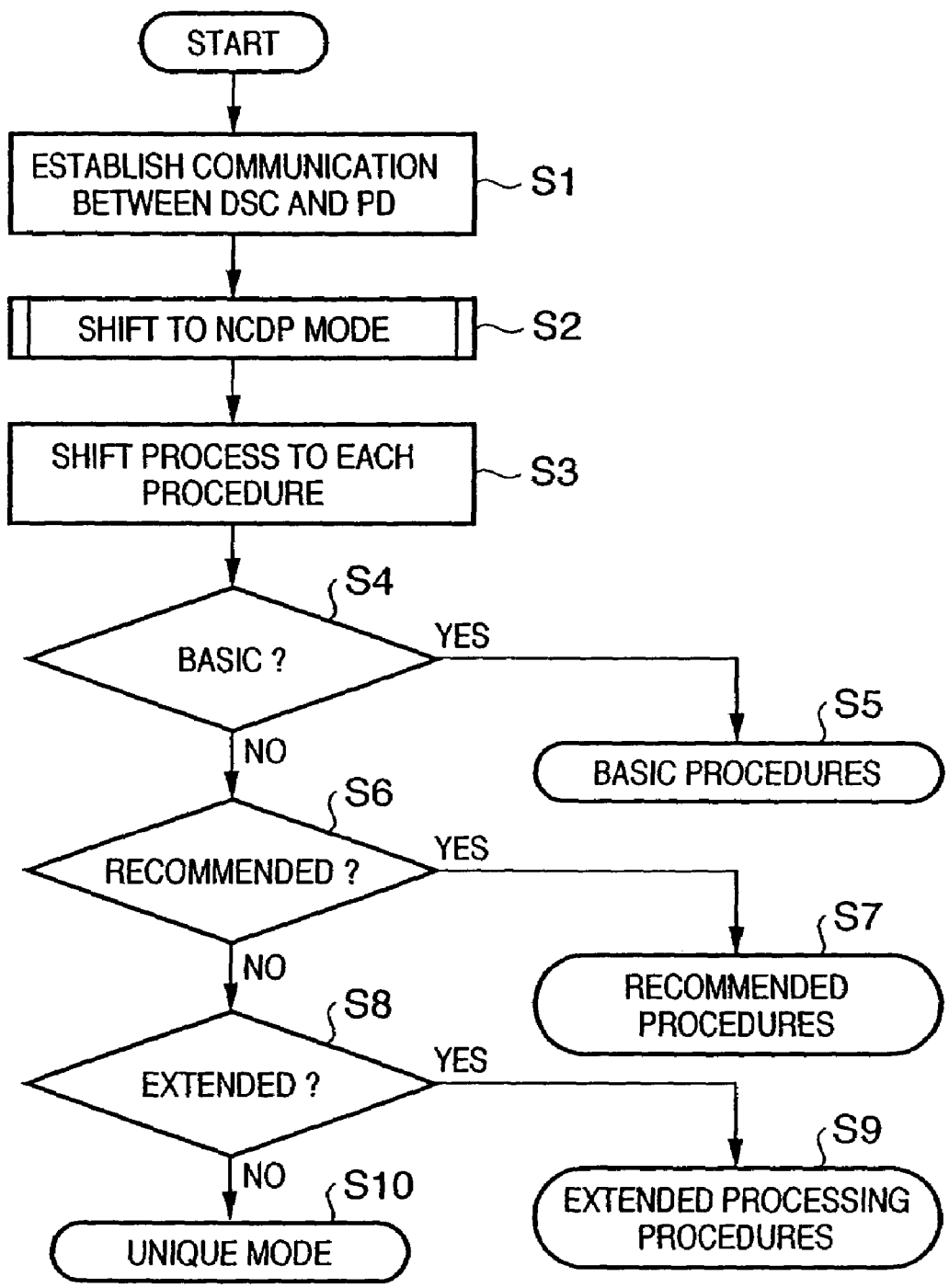
FIG. 13 is a flow chart for explaining an overview of the NCDP communication procedures according to the embodiment of the present invention.

FIG. 13 is a flowchart for explaining the processing sequence shown in FIG. 7.

In step S1, a communication is established between the DSC 3012 and PD printer 1000 (700). It is determined in step S2 whether these devices support the NCDP. If these devices support the NCDP, the NCDP mode starts. The flow then advances to step S3 to receive a procedure designation from the DSC 3012, and to start the designated procedures. If the "basic procedures" is designated, the flow advances from step S4 to step S5 to execute a print process based on the "basic procedures". On the other hand, if the "recommended procedures" is designated, the flow advances from step S6 to step S7 to execute a print process based on the "recommended procedures". Furthermore, if the "extended procedures" is designated, the flow advances from step S8 to step S9 to execute a print process based on the "extended procedures" corresponding to each vendor. If other procedures are designated, the flow advances to step S10 to execute a print process in a mode unique to the PD printer 1000 and DSC 3012.

An example (PTP wrapper) wherein various NCDP commands (FIG. 8) mentioned above are implemented using general-purpose PTP will be described below. In this embodiment, NCDP using PTP will be exemplified. However, the present invention is not limited to such specific example. For example, a direct print service API may be implemented on another interface or another class (Class).

[NCDPStart]

Figure 14:
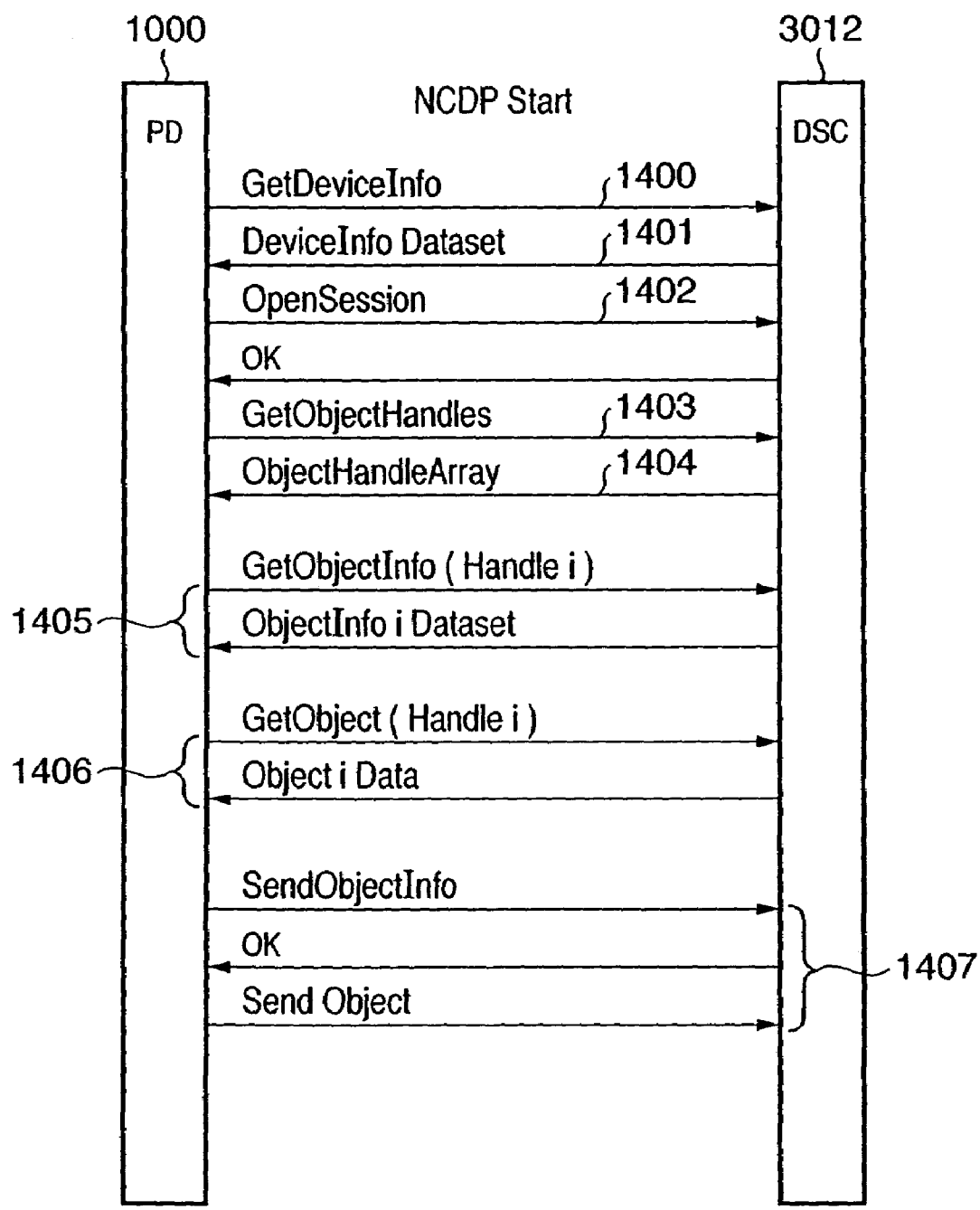
FIG. 14 depicts a view for explaining an implementation example of a command (NCDPStart) that designates to start the NCDP procedure using a PTP architecture.

FIG. 14 depicts a view for explaining an implementation example of a command (NCDPStart) that designates to start the NCDP procedures using the PTP architecture.

After the PD printer 1000 and DSC 3012 have been physically connected, the PD printer 1000 transmits GetDevice- Info to the DSC 3012 (1400) to request it to send information associated with objects held by the DSC. In response to this request, the DSC 3012 transmits information about objects held by itself to the PD printer 1000 using DeviceInfo Dataset. By OpenSession (1402), a start request of procedures that assign the DSC 3012 as a resource, assign handles to data objects as needed, and make a special initialization process is issued. Upon reception of an acknowledgement (OK) from the DSC 3012, PTP communications start. The PD printer 1000 requests the DSC 3012 to send all script handles (Storage ID: FFFFFF, Object Type: Script) (1403). In response to this request, the DSC 3012 returns a list of all handles held by it (1404). Information of the i-th object handle is acquired from the PD printer 1000 (1405, 1406). If this object includes a keyword (e.g., "Marco") indicating identification of the DSC 3012, the PD printer 1000 instructs to send object information (SendObjectInfo) (1407). Upon reception of an acknowledgement (OK) in response to this instruction, the PD printer 1000 transmits object information to the DSC 3012 by SendObject. Note that this object includes, e.g., "Polo" as a response keyword corresponding to the aforementioned keyword.

In this manner, the PD printer 1000 and DSC 3012 can recognize each other as connected partners. After that, the control can shift to the NCDP procedures (701 in FIG. 7). Transport layers that can exchange files can reliably exchange keywords. That is, keywords can be exchanged without adding any unique commands to NCDP of this embodiment. Note that the keywords are not limited to the aforementioned example, and the PD printer and DSC may use the same keyword. In order to shorten the time required for negotiations using the keywords, each keyword may be set at the head of a script handle. As a result, the time required to confirm partner devices can be shortened.

[ProcedureStart]

Figure 15:
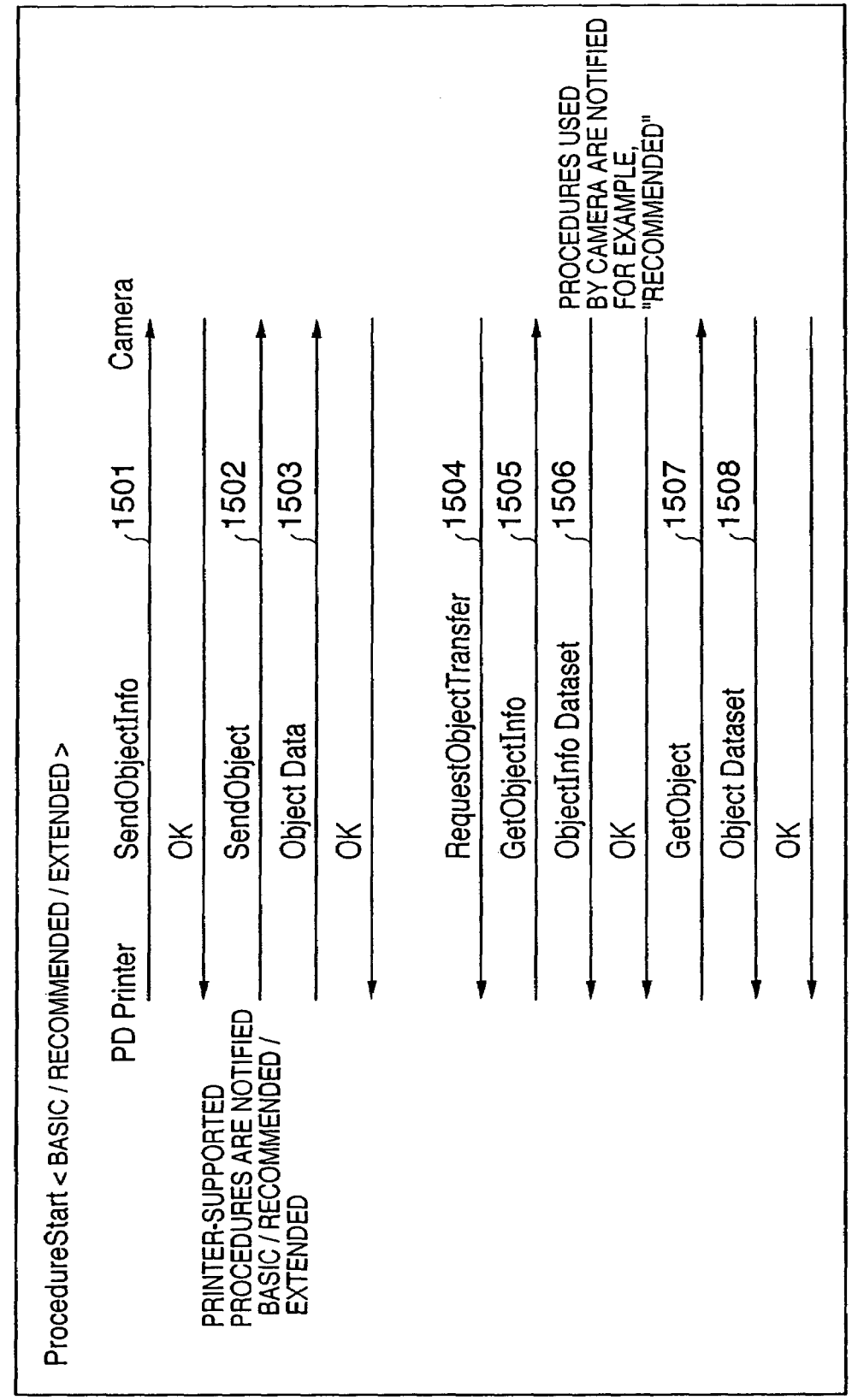
FIG. 15 depicts a view for explaining an implementation example of a procedure (ProcedureStart) that receives a shift command to respective procedures from the camera using the PTP architecture.

FIG. 15 depicts a view for explaining an implementation example of an instruction (ProcedureStart) used to start a given mode upon reception of an instruction that designates a shift procedure to that mode from the DSC 3012 using the PTP architecture.

In order to notify the DSC 3012 of procedures the "basic procedures", the "recommended procedures", and the "extended procedures" supported by the PD printer 1000, the PD printer 1000 notifies the DSC 3012 of the presence of object information to be sent to it using SendObjectInfo (1501). Upon reception of an acknowledgement (OK) from the DSC 3012 in response to this command, the PD printer sends a message indicating that it is ready to transmit an object to the DSC 3012 using SendObject (1502), and then transmits information associated with the procedures supported by the PD printer 1000 using ObjectData (1503). The DSC 3012 notifies the PD printer 1000 that it wants to launch a GetObject operation (shift to a push mode) (1504). If the PD printer 1000 sends a message indicating that it is ready to receive information associated with object information (GetObjectInfo) (1505), that information is returned using ObjectInfo Dataset (1506). If object information itself is requested by designating that object information (1507), the DSC 3012 informs the PD printer 1000 of procedures ("basic", "recommended", "extended", and the like) that the DSC 3012 uses by Object Dataset (1508).

In this manner, the DSC 3012 can designate a print mode of image in the PD printer 1000.

[NCDPEnd]

Figure 16:
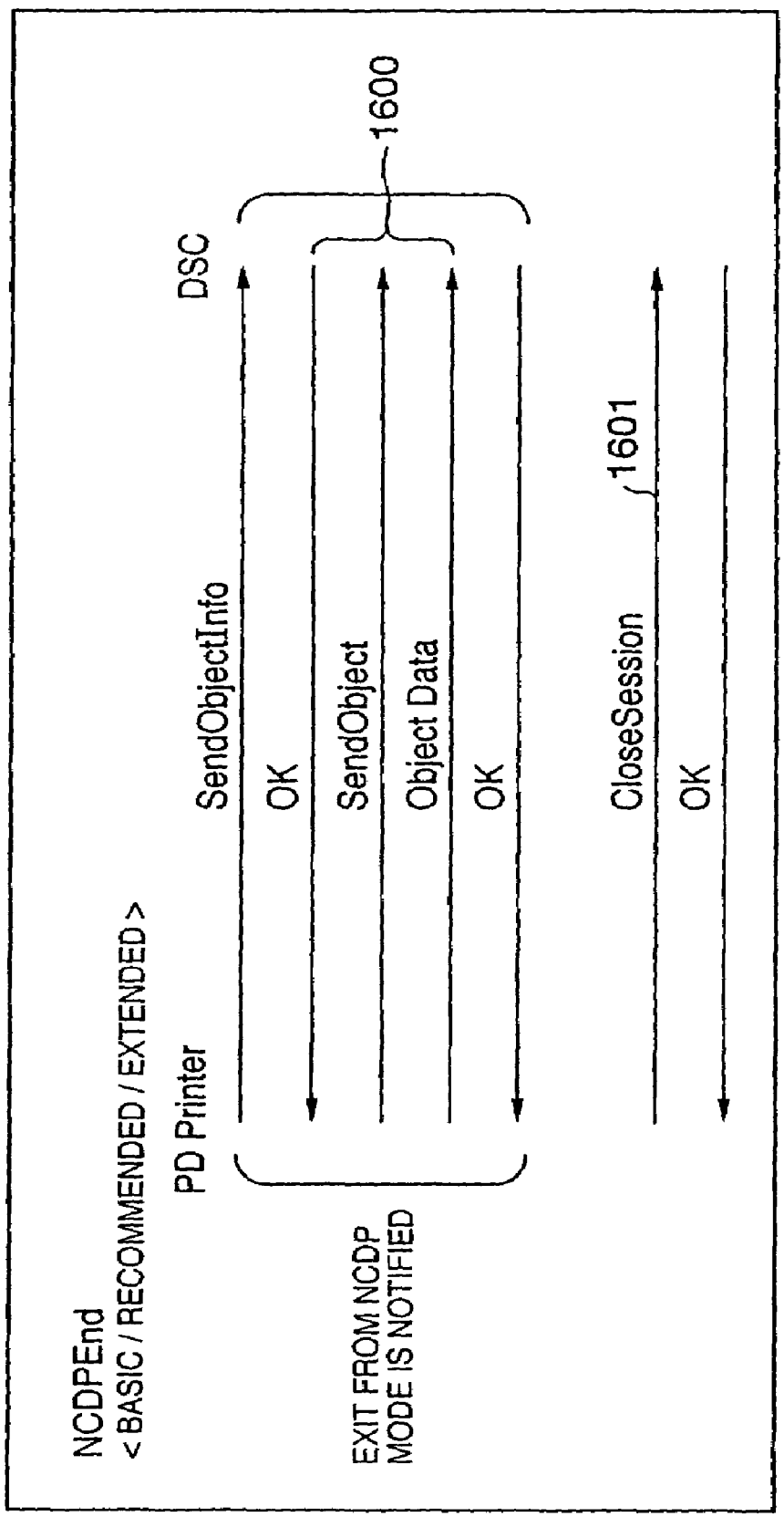
FIG. 16 depicts a view for explaining an implementation example of a command (NCDPEnd) that designates to end the NCDP procedure using the PTP architecture.

FIG. 16 depicts a view for explaining an implementation example of an instruction (NCDPEnd) used to end the NCDP communication control procedures according to this embodiment using the PTP architecture.

In this procedure, the PD printer 1000 informs the DSC 3012 of the presence of object information to be sent to it (1600), and notifies the DSC 3012 that it leaves the NCDP mode using ObjectData. Upon reception of an acknowledgement (OK), CloseSession is transmitted (1601) to end this communication. In this way, the NCDP communication procedures end.

[getCapability]

Figure 17:
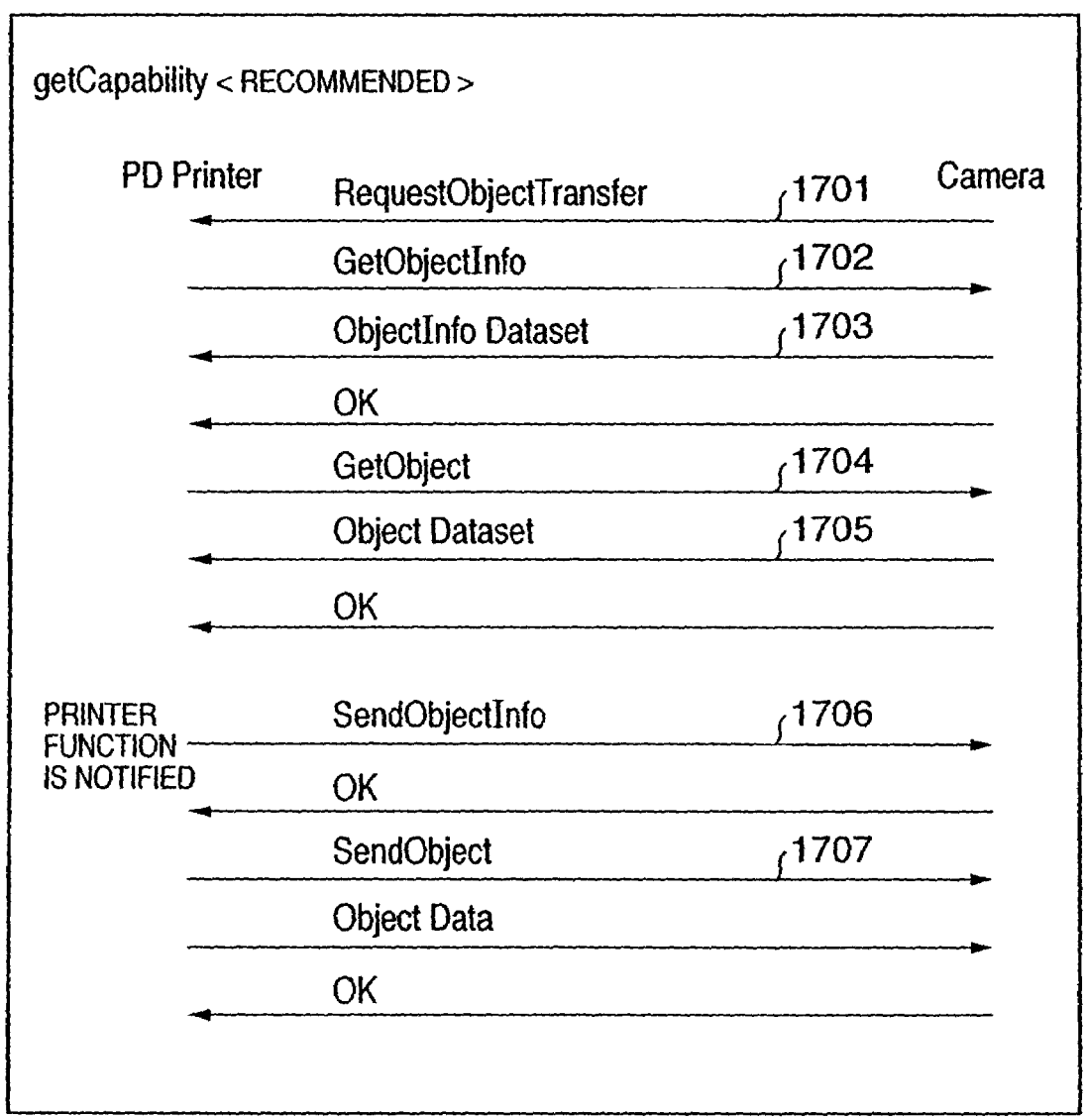
FIG. 17 depicts a view for explaining an implementation example of a command (Capability) that transmits Capability data from the PD printer to the camera in the NCDP procedure using the PTP architecture.

FIG. 17 depicts a view for explaining an implementation example of communication procedures in a Capability instruction used to notify the DSC 3012 of the functions of the PD printer 1000 in NCDP of this embodiment using the PTP architecture.

In this procedure, the DSC 3012 informs the PD printer 1000 of the presence of an object to be sent to it using RequestObjectTransfer (1701). If the printer 1000 requests information of that object (1702), the DSC 3012 notifies the printer 1000 of a data set of the object to be transferred (1703). If the printer 1000 issues an acquisition command (GetObject) of the object to the DSC 3012 (1704), the object is transmitted from the DSC 3012 to the printer 1000 in response to that command. As a result of transmission of this object, it is determined that the DSC 3012 requests the printer 1000 to send Capability data (1705).

The printer 1000 then transmits information associated with the requested object held by it to the DSC 3012. Capability information indicating the functions of the printer 1000 is transmitted from the PD printer 1000 to the DSC 3012 in a script format using SendObject and ObjectData (1707). In this manner, the PD printer 1000 and DSC 3012 can exchange their function information.

[GetImage]

Figure 18:
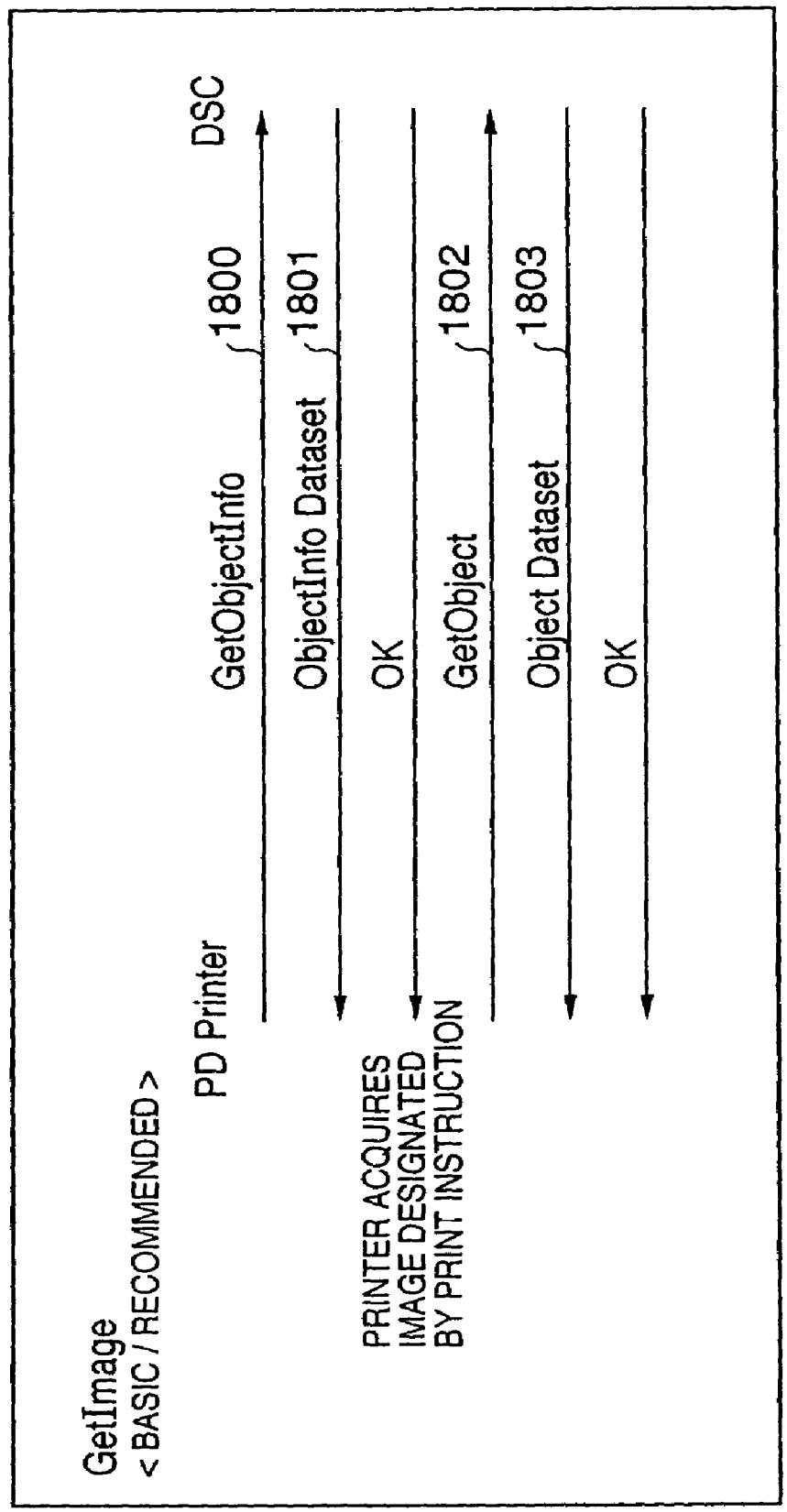
FIG. 18 depicts a view for explaining an implementation example of a procedure of a command (GetImage) that acquires an image file held in the camera from the PD printer in the NCDP procedure using the PTP architecture.

FIG. 18 depicts a view for explaining an implementation example of communication procedures executed when the PD printer 1000 acquires image data (JPEG image) held by the DSC 3012 (GetImage) in NCDP of this embodiment using the PTP architecture.

Upon sending a request of information associated with an object held by the DSC 3012 (1800), the DSC 3012 sends information (Object Dataset) associated with that object to the PD printer 1000 (1801). If an acquisition request (GetObject) is issued by designating that object (1802), the DSC 3012 transmits the requested image file (Object Dataset) to the PD printer 1000 (1803). In this way, the PD printer 1000 can acquire a desired image file from the DSC 3012.

[StatusSend]

Figure 19:
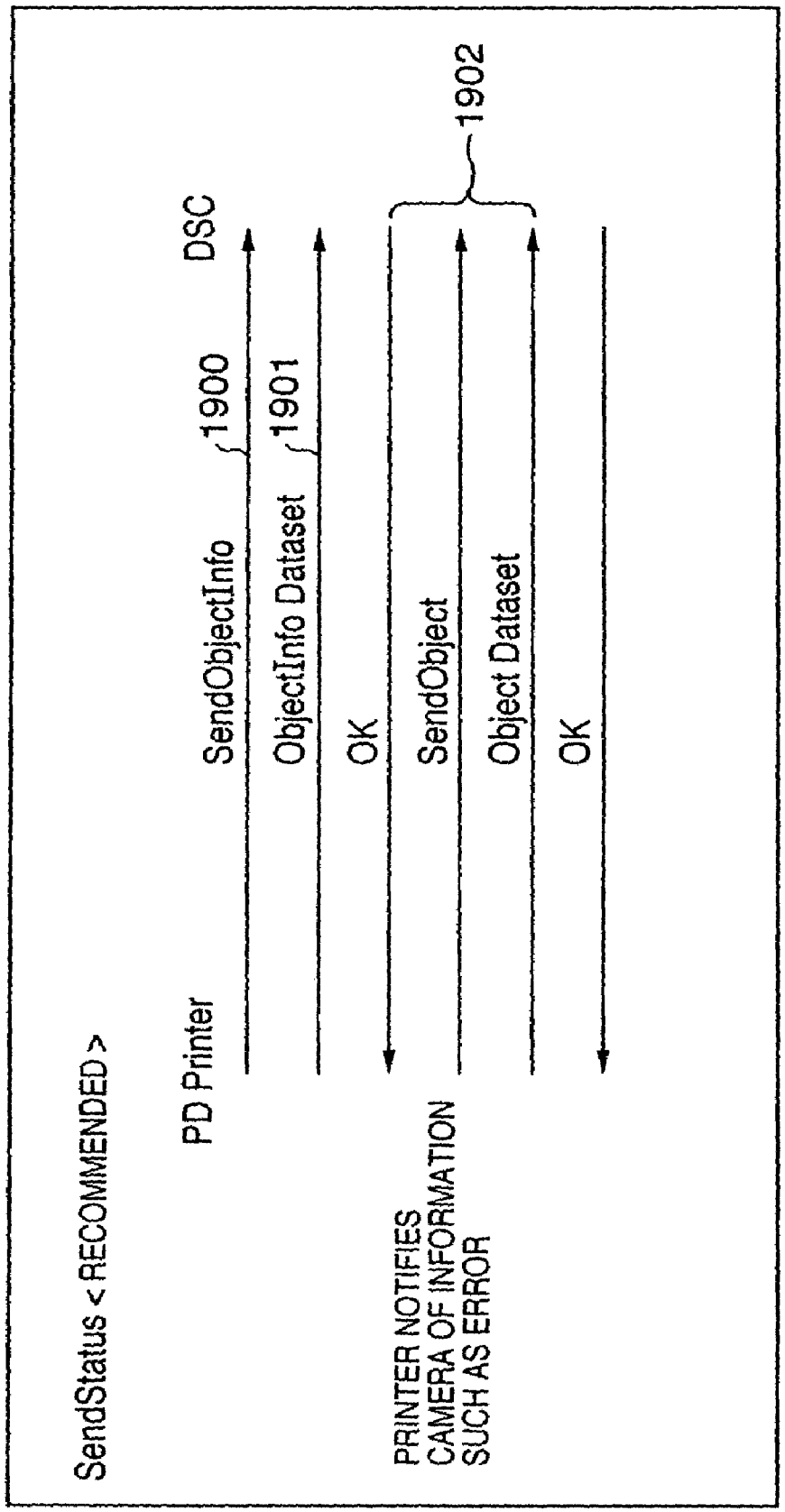
FIG. 19 depicts a view for explaining an implementation example of a procedure of a command (StatusSend) that transmits error status from the PD printer to the camera in the NCDP procedure using the PTP architecture.

FIG. 19 depicts a view for explaining an implementation example of communication procedures executed when the PD printer 1000 notifies the DSC 3012 of error status or the like (StatusSend) in NCDP of this embodiment using the PTP architecture.

The PD printer 1000 notifies the DSC 3012 of the presence of object information to be sent to it using SendObjectInfo (1900). Then, the PD printer 1000 transmits an information set (Object Dataset) associated with that object information to the DSC 3012 (1901). In response to an acknowledgement (OK) from the DSC 3012, status information of errors or the like in the PD printer 1000 is transmitted using SendObject and Object Dataset.

[PageEnd]

Figure 20:
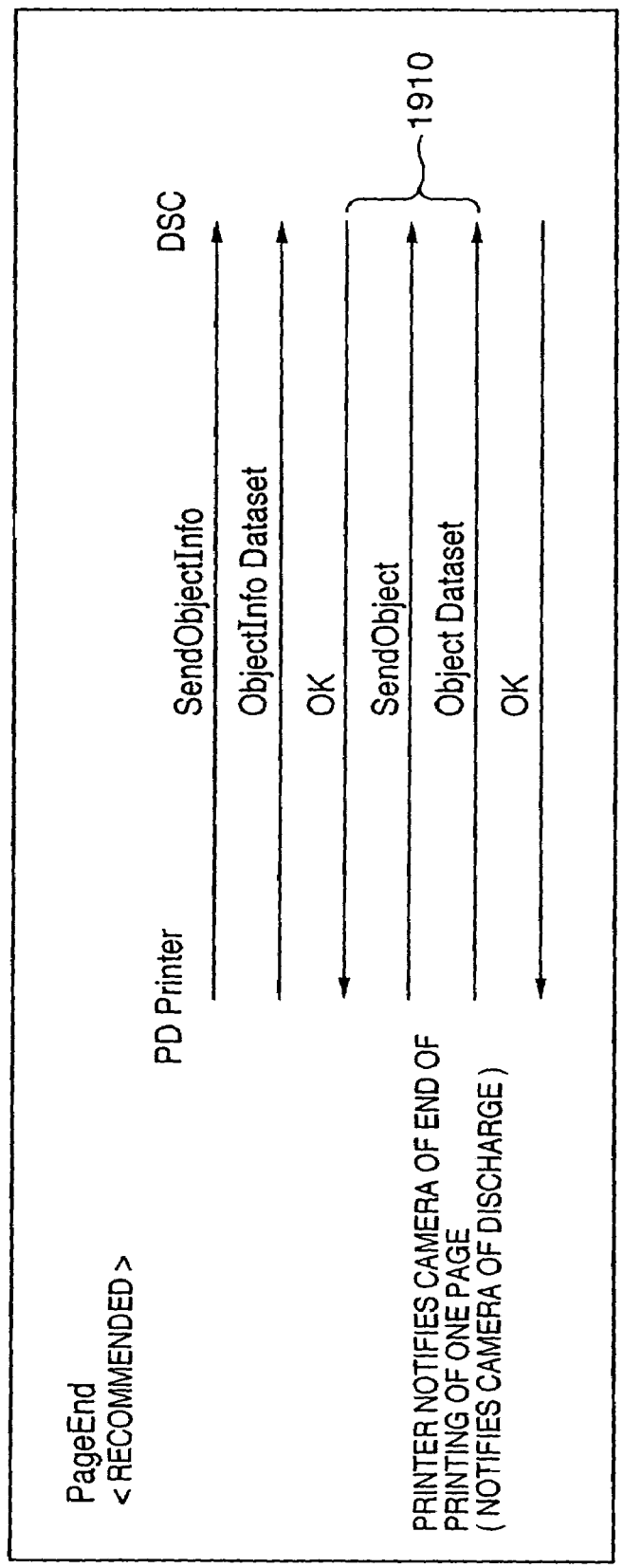
FIG. 20 depicts a view for explaining an implementation example of a procedure that transmits an end command (PageEnd) of a print process for one page from the PD printer to the camera in the NCDP procedure using the PTP architecture.

FIG. 20 depicts a view for explaining an implementation example of communication procedures executed when the PD printer 1000 notifies the DSC 3012 of the end of a print process for one page (PageEnd) in NCDP of this embodiment using the PTP architecture.

[JobEnd]

Figure 21:
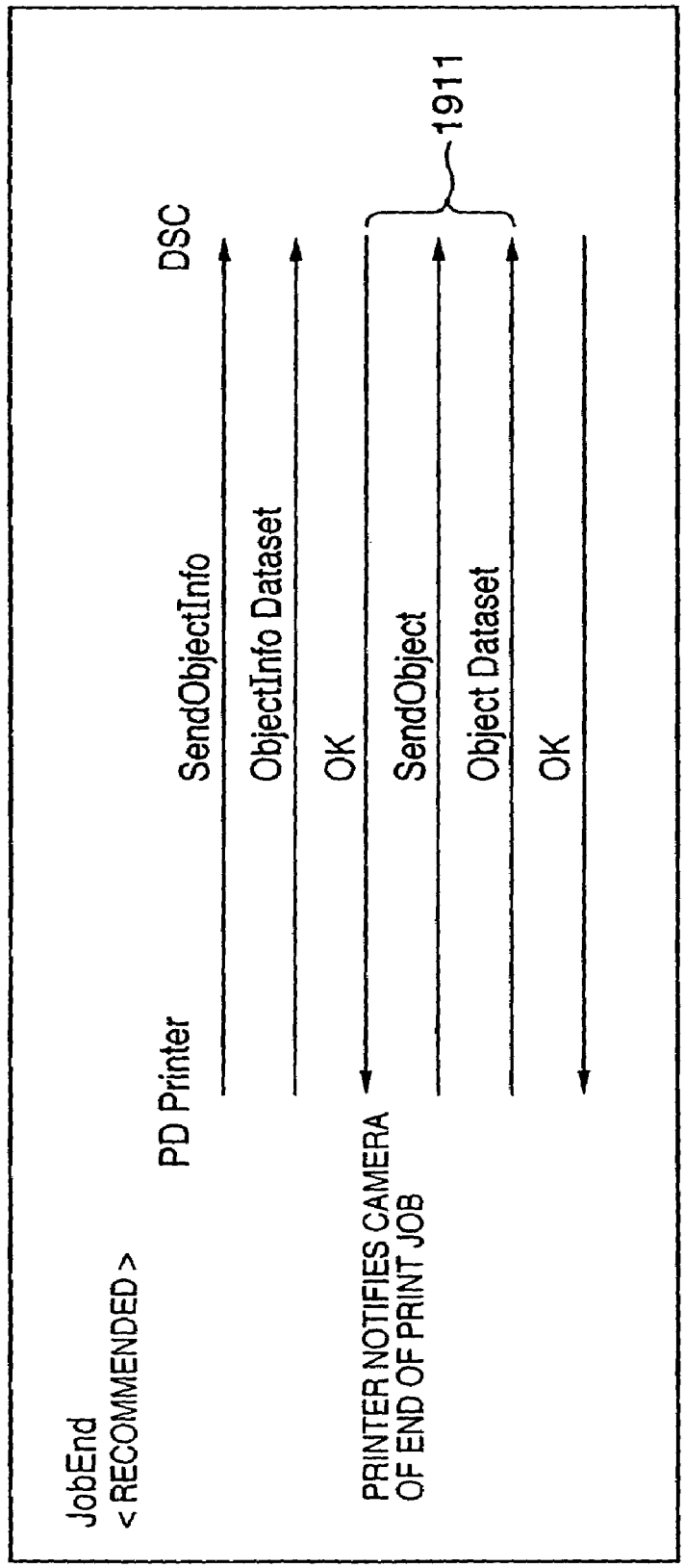
FIG. 21 depicts a view for explaining an implementation example of a procedure that issues an end command (JobEnd) of a print job from the PD printer to the camera in the NCDP procedure using the PTP architecture.

FIG. 21 depicts a view for explaining an implementation example of communication procedures executed when the PD printer 1000 notifies the DSC 3012 of the end of a print job (JobEnd) in NCDP of this embodiment using the PTP architecture.

In FIGS. 20 and 21, after execution of procedures 1900 and 1901 in FIG. 19, the PD printer 1000 notifies the DSC 3012 of the end of the print process for one page (1910 in FIG. 20), and the PD printer 1000 notifies the DSC 3012 of the end of the print job (1911 in FIG. 21).

[JobStart]

Figure 22:
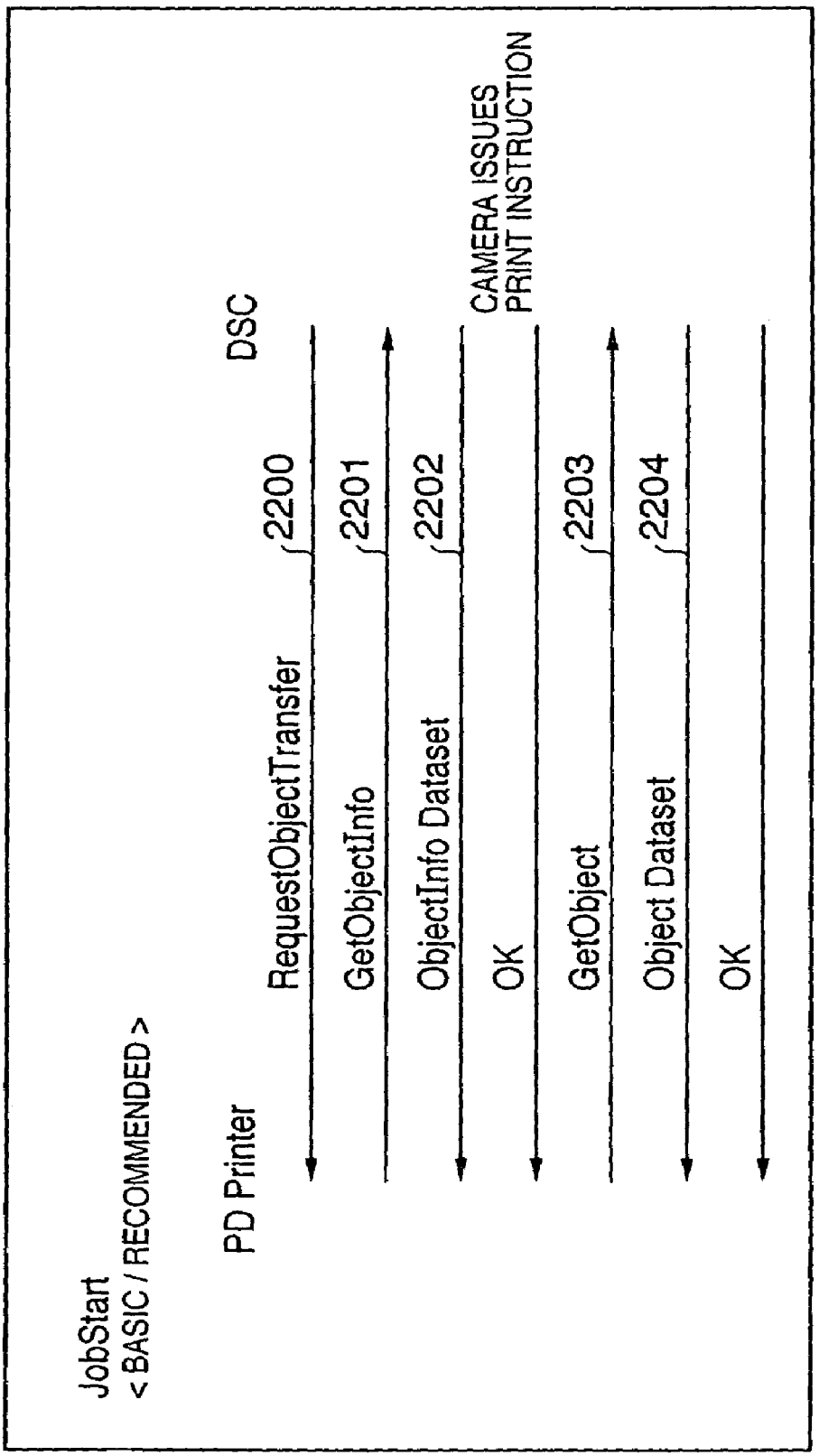
FIG. 22 depicts a view for explaining an implementation example of a procedure that issues a print command (JobStart) from the camera to the PD printer in the NCDP procedure using the PTP architecture.

FIG. 22 depicts a view for explaining an implementation example of communication procedures executed when the DSC 3012 notifies the PD printer 1000 of the start of a print job (JobStart) in NCDP of this embodiment using the PTP architecture.

The DSC 3012 sends RequestObjectTransfer to the PD printer 1000 (2200) so as to urge the PD printer 1000 to issue a GetObject command. As a result, if the PD printer 1000 issues GetObjectInfo (2201), the DSC 3012 transmits information associated with object information to be transmitted. In response to this information, if the PD printer 1000 requests object information (GetObject: 2203), Object Dataset is transmitted to issue a print instruction from the DSC 3012 to the PD printer 1000 (2204).

[JobAbort]

Figure 23:
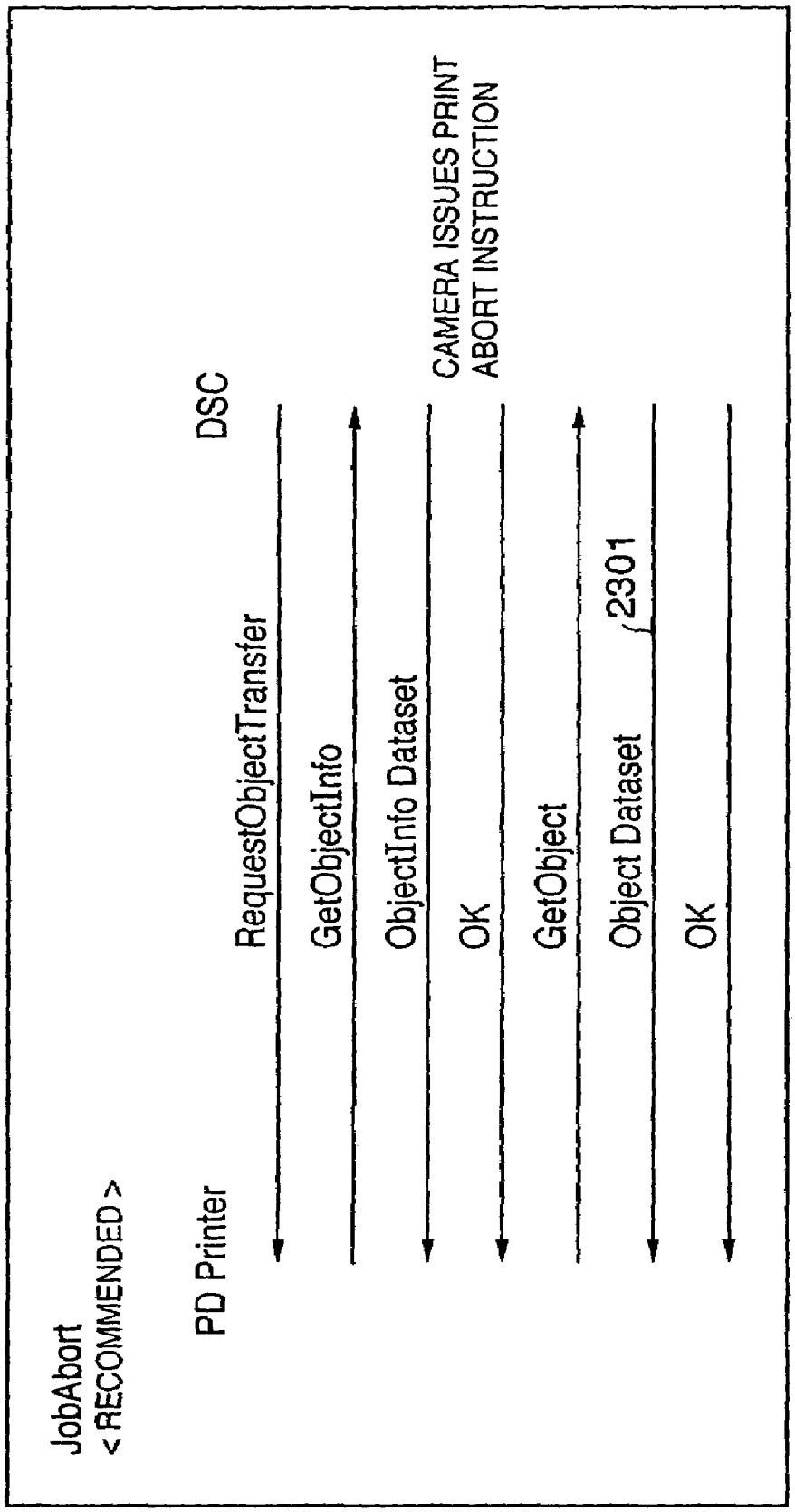
FIG. 23 depicts a view for explaining an implementation example of a procedure that issues a print abort command (JobAbort) from the camera to the PD printer in the NCDP procedure using the PTP architecture.

FIG. 23 depicts a view for explaining an implementation example of communication procedures executed when the DSC 3012 issues a print abort instruction to the PD printer 1000 (JobAbort) in NCDP of this embodiment using the PTP architecture.

[JobContinue]

Figure 24:
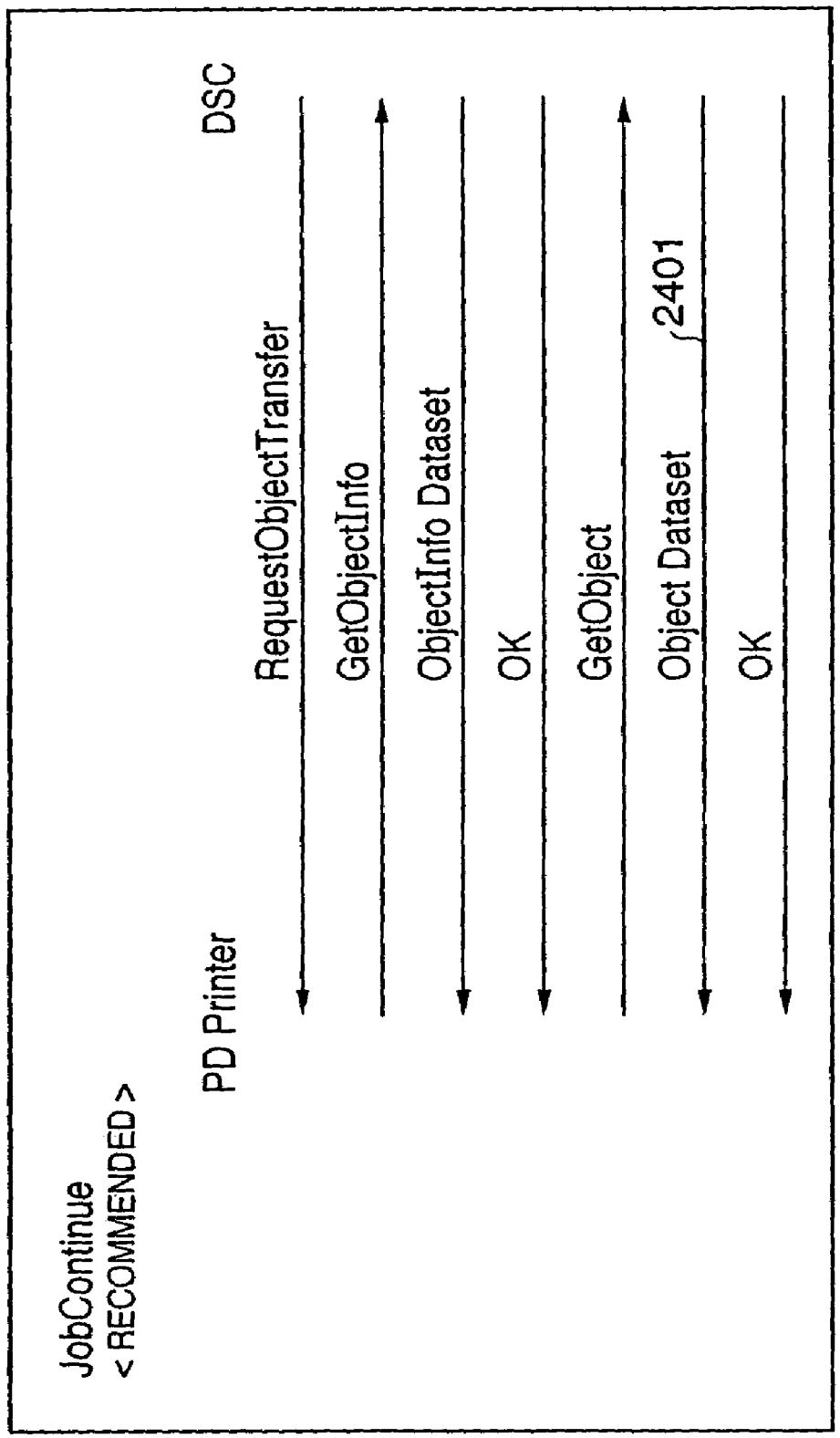
FIG. 24 depicts a view for explaining an implementation example of a procedure that issues a print restart command (JobContinue) from the camera to the PD printer in the NCDP procedure using the PTP architecture.

FIG. 24 depicts a view for explaining an implementation example of communication procedures executed when the DSC 3012 issues a print restart instruction to the PD printer 1000 (JobContinue) in NCDP of this embodiment using the PTP architecture.

In FIGS. 23 and 24, after procedures 2200 to 2203 in FIG. 22 are executed, the DSC 3012 issues a print abort instruction to the PD printer 1000 (2301 in FIG. 23), and sends a print restart instruction to the PD printer 1000 (2401 in FIG. 24).

[Capability]

The communication procedures between the PD printer 1000 and DSC 3012 and the processes in the PD printer 1000 and DSC 3012 as characteristic features according to this embodiment will be described below.

In this embodiment, since the DSC 3012 connected to the PD printer 1000 is based on the assumption that unspecified digital cameras manufactured by respective vendors are connected, even when the PD printer 1000 transmits information of its all functions to the DSC as Capability information, that DSC may not often recognize all or some contents of that Capability information. In such case, a print job file which describes print conditions that the PD printer 1000 did not intend may be sent from the DSC. If the PD printer 1000 cannot execute a print process under the print conditions designated by the print job file, it notifies the DSC that the received print job cannot be processed.

Figure 25:
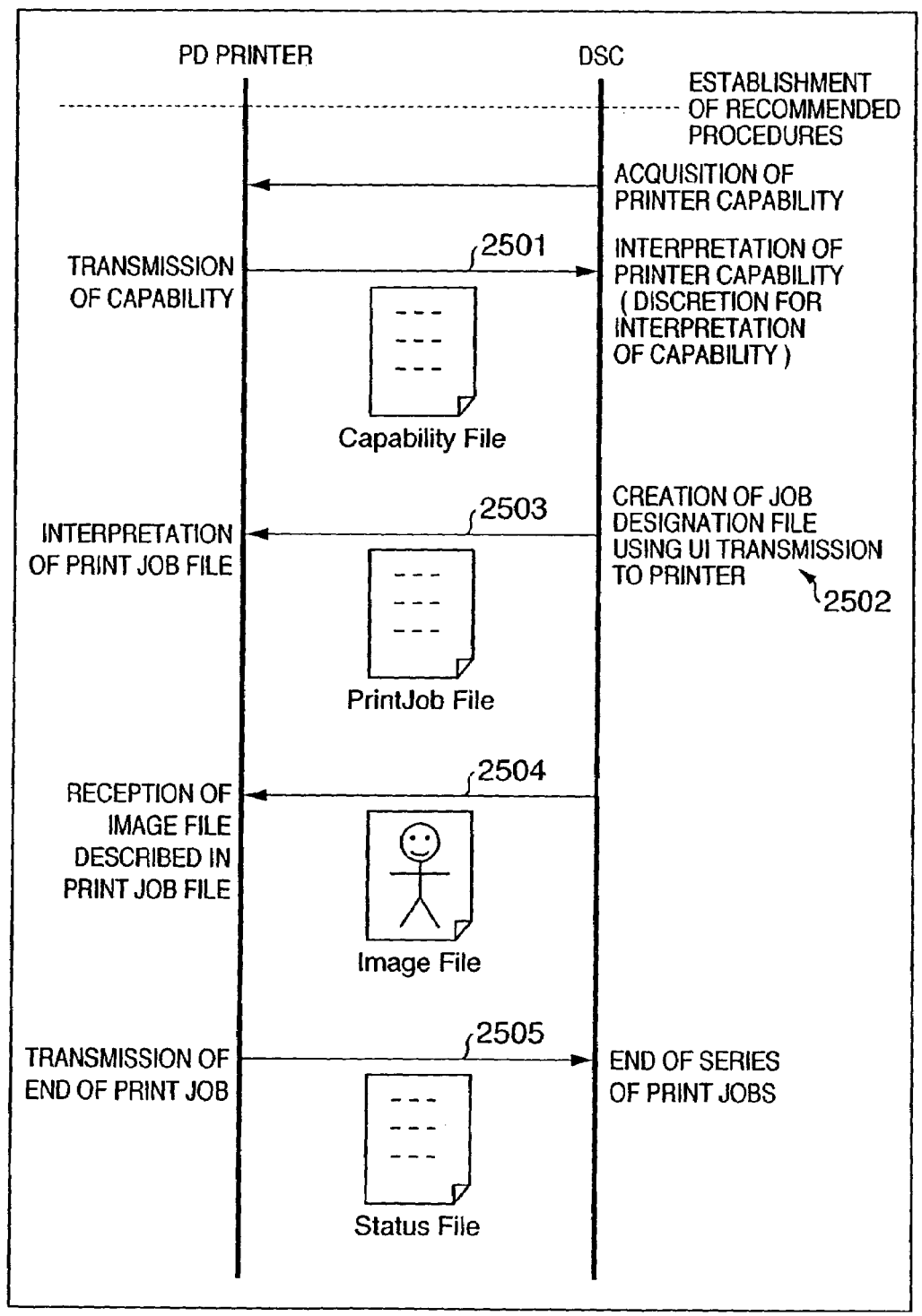
FIG. 25 is a chart for explaining exchange of data based on "recommended procedure" between the DSC and PD printer according to the embodiment of the present invention.

FIG. 25 is a chart for explaining the exchange procedures of Capability information in the "recommended procedures" shown in FIG. 11.

Referring to FIG. 25, the PD printer 1000 transmits Capability information in the script notation to the DSC 3012 (2501), as described above. The DSC 3012 interprets this Capability information, and ignores items which cannot be understood if any. The user of the DSC 3012 designates an image file to be printed and print conditions (paper type, paper size, image quality, and the like) using the UI of the DSC 3012 (2502). In this way, a print job file that designates a print job is generated. The DSC 3012 sends the print job file that designates the print job to the PD printer 1000 (2503). Upon reception of this file, the PD printer 1000 interprets the contents described in the print job file, and prints an image file received in 2504 under the print conditions designated by the print job file. Upon completion of the print process, the PD printer 1000 notifies the DSC 3012 of the end of the print job (2505).

When the size of papers set in the PD printer 1000 is "L size", but print of "A4 size" is designated as the Capability paper size in the print job file received from the DSC 3012, the PD printer 1000 notifies the DSC that the print job cannot be processed.

Figure 26:
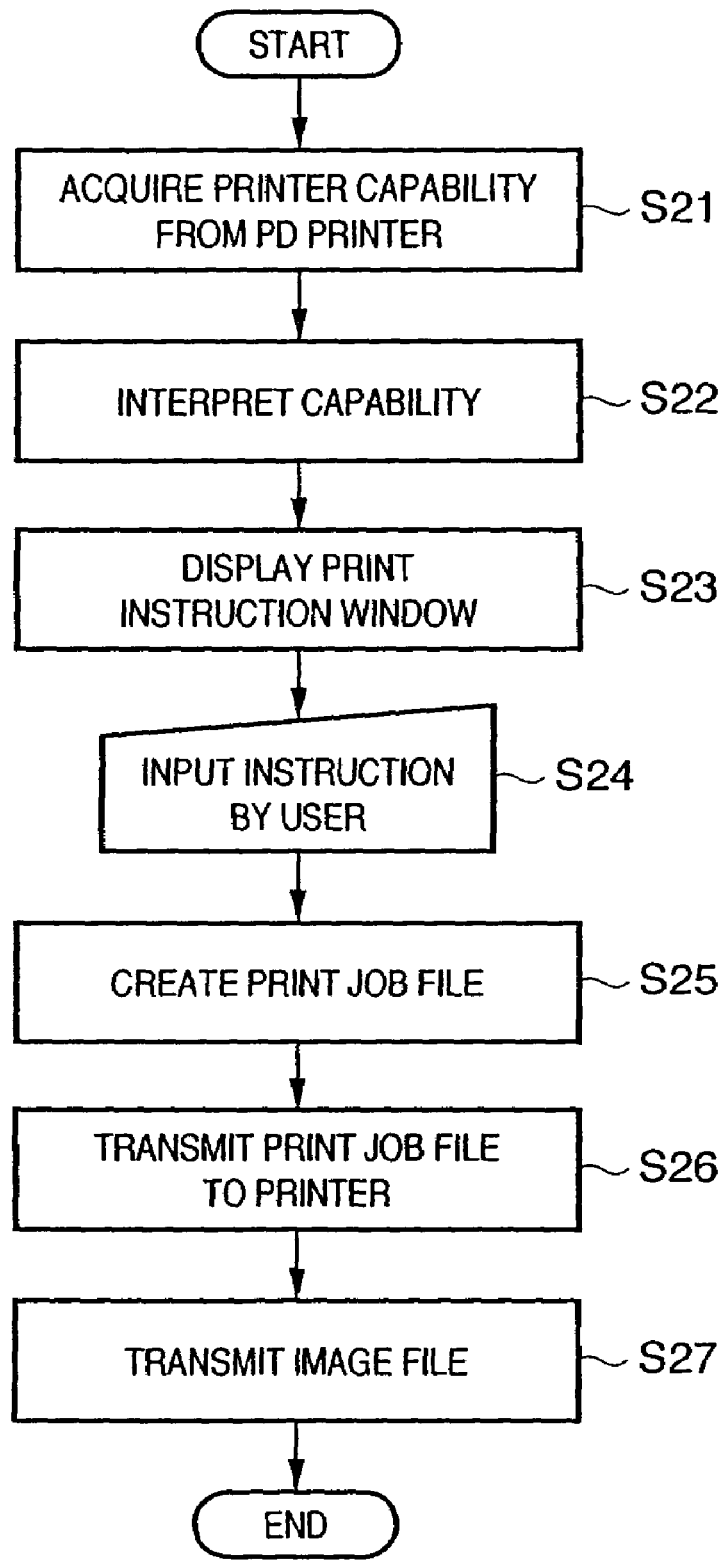
FIG. 26 is a flowchart for explaining a print instruction based on "recommended procedure" in the DSC according to the embodiment of the present invention.

FIG. 26 is a flowchart for explaining the process in the DSC 3012 in the aforementioned processing sequence based on the "recommended procedures".

If Capability information is received from the PD printer 1000 in step S21, the flow advances to step S22 to interpret the Capability information. If there are items that cannot be understood by the DSC 3012, they are ignored. The flow advances to step S23 to display a print instruction window (UI) on the display unit (2700 in FIG. 27) of the camera 3012, and the user inputs a print instruction using the UI window in step S24. After the print instruction is input, the flow advances to step S25 to generate a print job file that describes an image file to be printed, various print conditions, and the like, which are set using the UI by a user. In step S26, the print job file is transmitted to the PD printer 1000. In step S27, the image file described in the print job file is transmitted to the PD printer 1000.

<Overview of Digital Camera>

Figure 27:
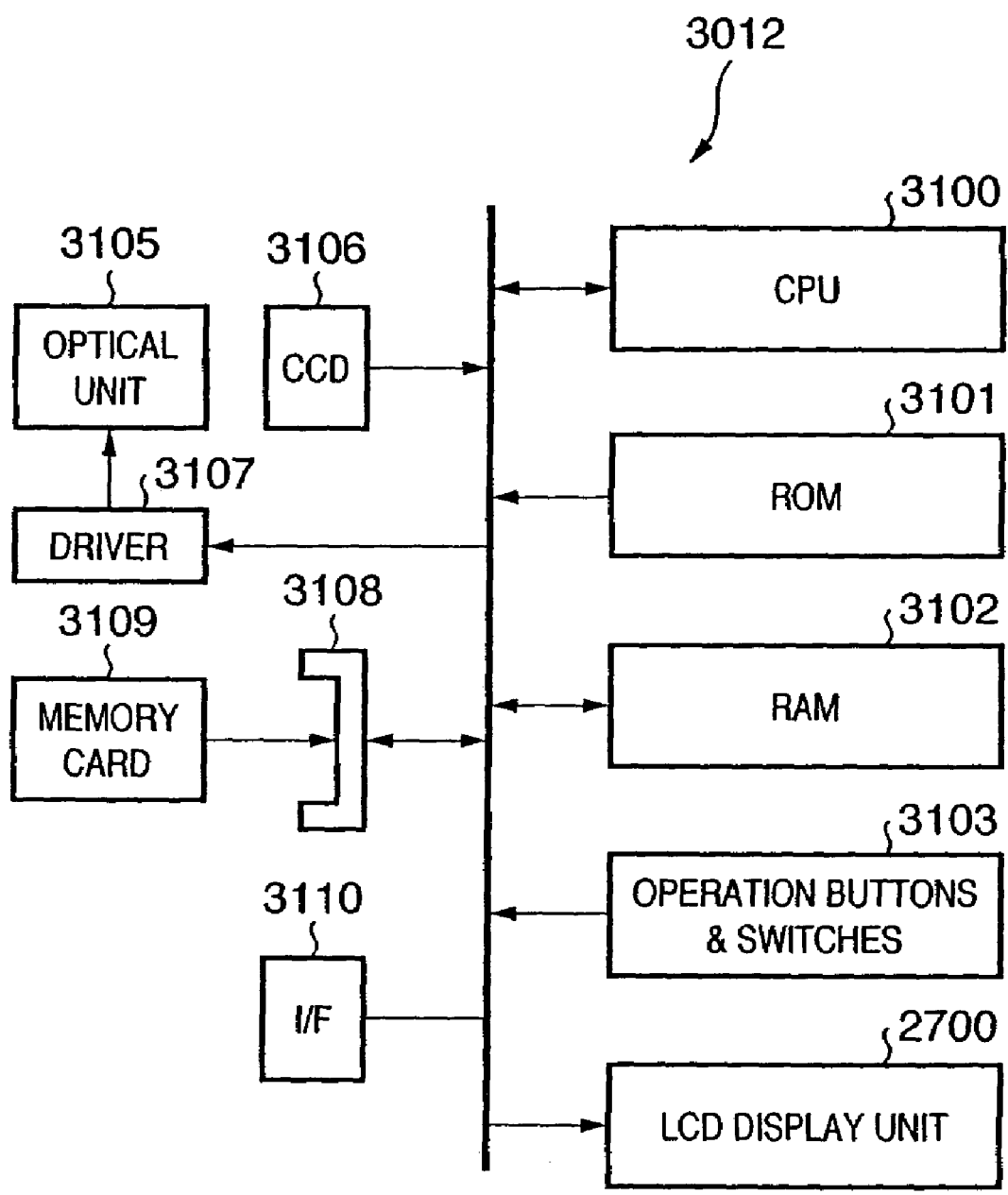
FIG. 27 is a block diagram showing the arrangement of the DSC according to the embodiment of the present invention.

FIG. 27 is a block diagram showing the arrangement of the DSC (digital camera) 3012 according to this embodiment.

Referring to FIG. 27, reference numeral 3100 denotes a CPU which controls the overall DSC 3012; and numeral 3101 denotes a ROM that stores the processing sequence by the CPU 3100. Reference numeral 3102 denotes a RAM which is used as a work area of the CPU 3100, and numeral 3103 denotes a switch group which is used to make various operations, and includes a shutter, mode switch, select switch, cursor keys, and the like. Reference numeral 2700 denotes a liquid crystal display unit which is used to display a video picture that is captured currently, and images photographed and stored in the memory card, and to display a menu upon making various setups. Reference numeral 3105 denotes an optical unit which mainly comprises a lens and its drive system. Reference numeral 3106 denotes a CCD element; and numeral 3107 denotes a driver for controlling to drive the optical unit 3105 under the control of the CPU 3100. Reference numeral 3108 denotes a connector used to connect a storage medium 3109 (Compact Flash® memory card, smart media, or the like); and numeral 3110 denotes a USB interface (slave side of the USB) used to connect a PC or the PD printer in this embodiment.

First Embodiment

The first embodiment of the present invention will be described below. In the first embodiment, the process between the DSC 3012 that does not support a capabilityChanged function used to inform a change in capability of the DSC 3012, and the PD printer 1000 that supports the function will be explained.

A capabilityChanged tag used to inform a change in capability is Optional (option) in both the DSC 3012 and the PD printer 1000, and whether or not the function for informing the capabilityChanged is supported is an arbitrary design item of each vendor of DSC and PD printer. In the first embodiment, assume that the PD printer 1000 does not have any command for acquiring information indicating whether or not the DSC 3012 supports the capabilityChanged. Upon reception of this capabilityChanged tag, the tag can be ignored without being interpreted, and OK can be replied.

The capabilityChanged tag includes two status values "True" and "False". "True" status indicates that capability supported by the printer 1000 has been changed; "False" status indicates that capability remains unchanged.

More specifically, if a tray that accommodates L-size paper sheets is equipped on the paper tray 1004 of the PD printer 1000, the capability paper size at that time is <PaperSize=L>. If the L-size tray is exchanged by a postcard tray, the capability paper size is changed to <PaperSize=Hagaki (post card)>. In this state, CapabilityChanged goes "True" indicating that capability has changed.

On the other hand, if the paper tray 1004 remains the same, i.e., if the capability paper size is <PaperSize=L> from the start of NCDP until the current timing, capabilityChanged remains "False".

Under such assumption, when the PD printer 1000 transmits "sendStatus(CapabilityChanged=True)" to the DSC 3012 to notify the DSC 3012 that capability of the PD printer 1000 has been changed, the DSC 3012 cannot understand that capability has been changed since it does not support this CapabilityChanged tag. For this reason, even when the PD printer 1000 receives "OK" from the DSC 3012 as a reply, it cannot determine if the DSC 3012 can correctly understand it. Therefore, there may be a problem in which the capability of the PD printer 1000 has been changed and the DSC 3012 transmits a "jobStart" command, which is set without understanding the current state of the PD printer, to the PD printer 1000 so as to designate a print process.

On the other hand, even when the paper tray of the PD printer 1000 has been exchanged, since there is no means that notifies the DSC 3012, which does not support the capabilityChanged tag, of the exchange of the tray, a "jobStart" command which is set based on capability that is not supported by the printer 1000 is unwantedly transmitted from the DSC 3012 to the PD printer 1000.

Figure 28:
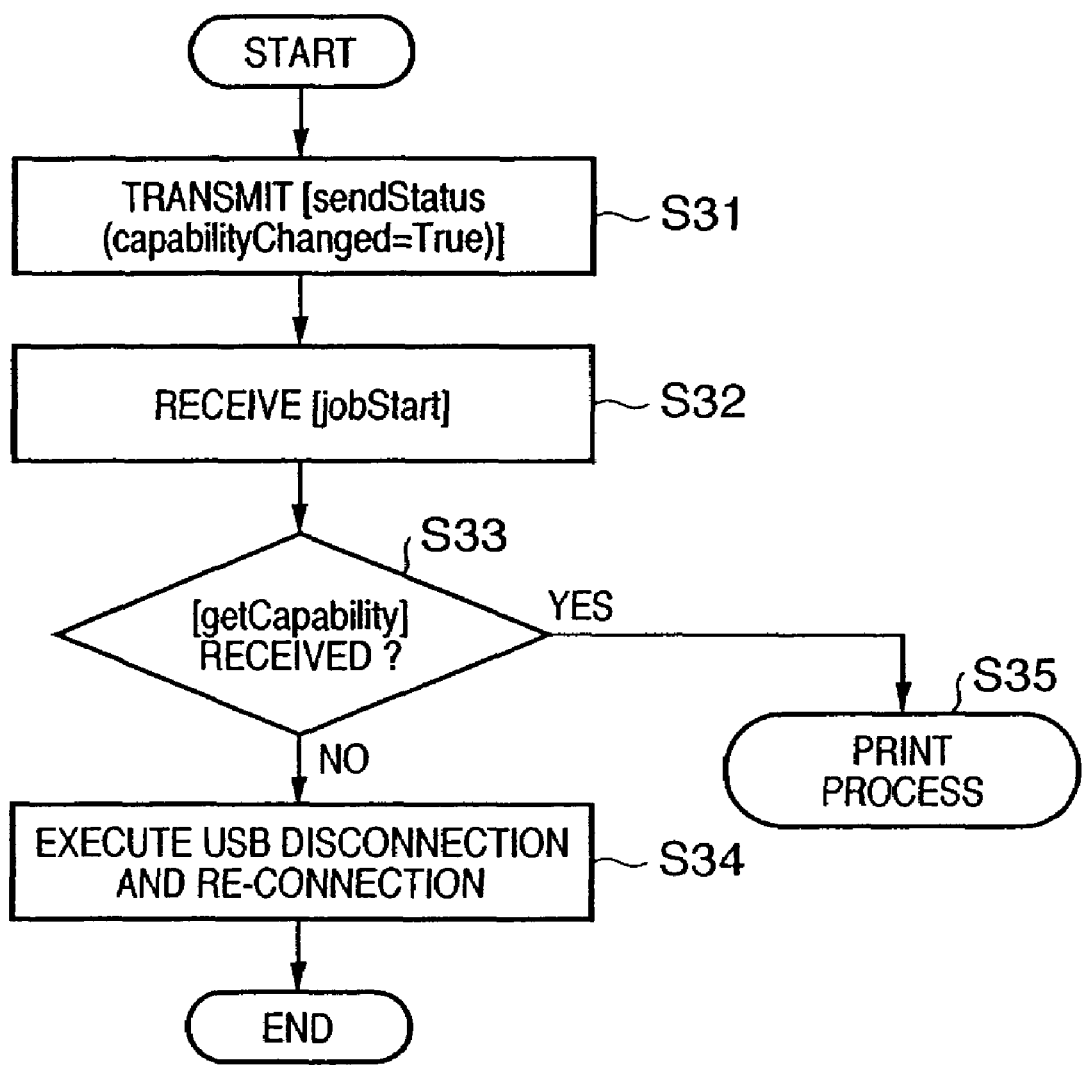
FIG. 28 is a flowchart for explaining the process in the PD printer according to the first embodiment of the present invention.

FIG. 28 is a flowchart for explaining the process in the PD printer 1000 according to the first embodiment of the present invention. A program that implements this process is stored in the program memory 3003a, and is executed under the control of the CPU 3002.

In step S31, the PD printer 1000 transmits "sendStatus (capabilityChanged=True)" to the DSC 3012 to notify that Capability of the printer 1000 has been changed. The flow advances to step S32, and the printer 1000 receives a print job from the DSC 3012 by "jobStart". The flow then advances to step S33, and the PD printer 1000 checks if it has received "getCapability" that requests the changed capability information from transmission of "sendStatus (capabilityChanged=True)" in step S31 until reception of "jobStart" in step S32. If the PD printer 1000 has received "getCapability", it indicates that the DSC 3012 can understand the capabilityChanged tag transmitted by the PD printer 1000 in step S31. Hence, it is estimated that capability of "jobStart" received in step S32 is not inconsistent with the capability, the change of which has been notified. Therefore, in this case, the flow advances to step S35 to proceed with a normal print process.

On the other hand, if it is determined in step S33 that the "getCapability" is not received, the flow advances to step S34. In this case, since it is estimated that the DSC 3012 does not support the capabilityChanged tag, the capability setup of "jobStart" received in step S32 may include capability which is not supported by the current PD printer 1000. For this reason, the PD printer 1000 temporarily disconnects USB connection, and establishes USB connection again. In this way, since the NCDP connection starts from the beginning, the PD printer 1000 can receive the "getCapability" from the DSC 3012 and can notify it of its capability.

As described above, even when the PD printer cannot determine whether or not the DSC supports a specific tag, it compares the current operation with an operation to be made by the DSC 3012 according to the contents of that specific tag, and can determine based on that comparison result whether or not the DSC supports the function of the specific tag.

As a result, in a case where the capability of the printer 1000 has been changed, the printer 1000 can make the DSC 3012 acquire the changed capability, and can receive a "jobStart" command of a print job, which is set based on the capability currently supported by the printer, from the DSC 3012.

It is more preferable that after the DSC 3012 receives new capability, the DSC 3012 corrects the already generated print job to match with the new capability of the PD printer 1000, and transmits the corrected print job to the PD printer 1000. In this case, the print job may be automatically corrected. Alternatively, the contents of the print job, which do not match the changed capability of the PD printer 1000, may be presented to the user using the UI to prompt the user to correct them according to the changed capability. For example, the contents of the print job may be displayed on the UI using a character string, and a portion that does not match the new capability may be displayed in a different color, thus prompting the user to correct it.

Note that determining whether or not the capabilityChanged tag is supported in step S33 of the first embodiment may be performed to determine whether or not the PD printer 1000, whose capability has been changed, supports capability set in "jobStart" received in step S32. Furthermore, this determination can also be implemented using both the determination result based on capability set in "jobStart" received in step S32 and the process in step S33.

Moreover, the means which allows the PD printer 1000 to make the DSC 3012 acquire capability in step S34 of the first embodiment can also be implemented by ending the NCDP mode by executing "NCDPEnd", and then executing "NCDPStart" that designates shift to the NCDP again. Alternatively, this means can be implemented by executing "closeSession" in the PTP, and then executing "openSession".

Figure 29:
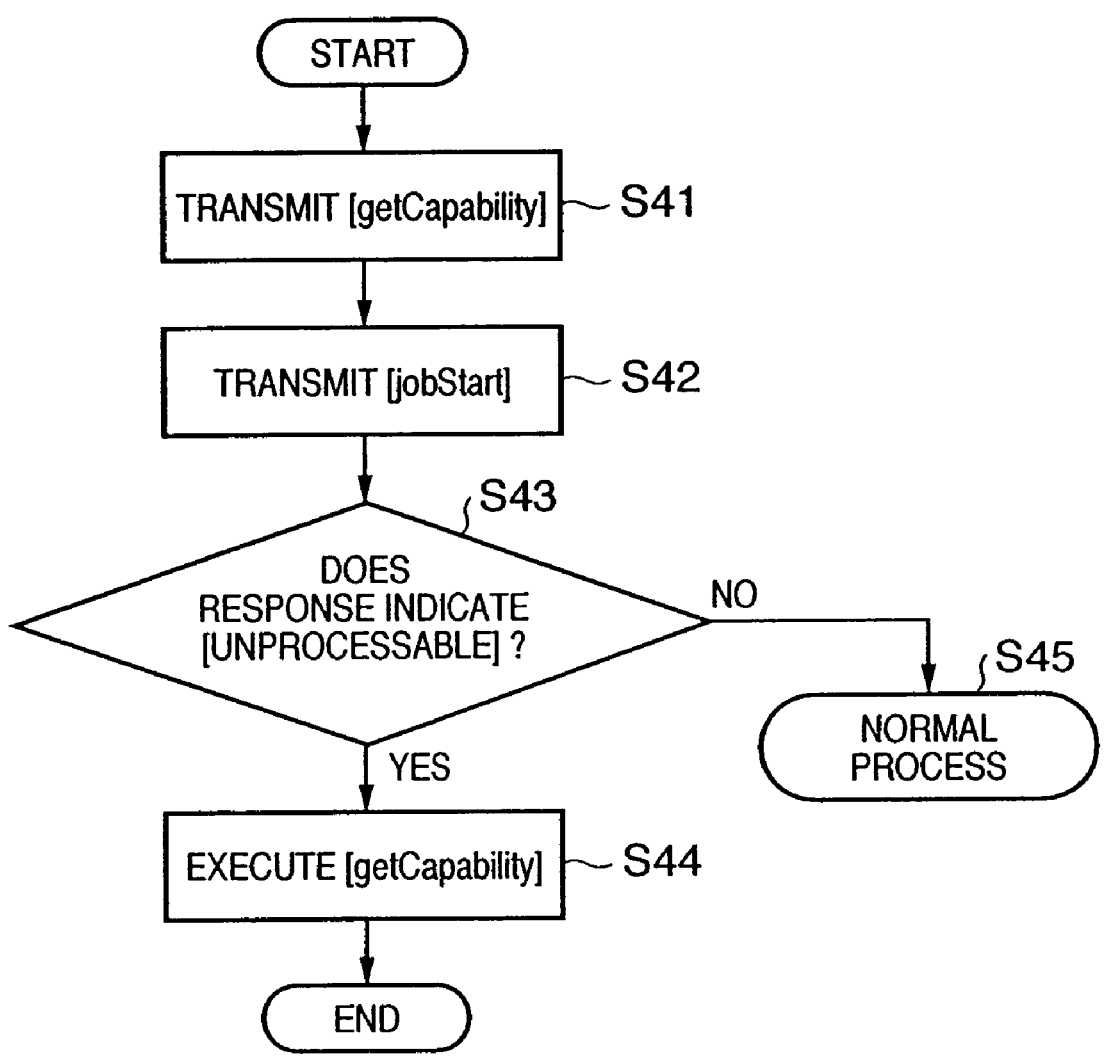
FIG. 29 is a flowchart for explaining the process in the DSC according to the first embodiment of the present invention.

FIG. 29 is a flowchart showing the process in the DSC 3012 according to the first embodiment of the present invention. A program that implements this process is stored in the ROM 3101 of the DSC 3012.

In step S41, the DSC 3012 transmits "getCapability" to the PD printer 1000 to request it to send capability information. The flow advances to step S42 to transmit a print job to the PD printer 1000 by "jobStart". The flow advances to step S43 to check if a response from the PD printer 1000 to "jobStart" transmitted in step S42 includes a message "unprocessable by the printer". If such "unprocessable" message is received, it is estimated that the PD printer 1000 does not support the capabilityChanged Tag and Capability supported by the printer 1000 has been changed.

More specifically, a case is assumed wherein the capability of the PD printer 1000 has been changed after the capability information of the PD printer 1000 is acquired in step S41 and before the DSC 3012 issues a print job to the PD printer 1000 in step S42. In this case, if the PD printer 1000 supports the capabilityChanged tag, the capabilityChanged tag should be transmitted from the PD printer 1000 before step S42. If a print job according to the capability of the PD printer 1000 acquired in step S41 is issued from the DSC 3021 to the PD printer 1000 without receiving any capabilityChanged tag, and if the print job includes an item that does not match the capability of the PD printer 1000 at that time, then it is determined by the DSC 3012 that the PD printer 1000 does not support the capabilityChanged tag.

If a response other than the message "unprocessable by the printer" is received in step S43, the DSC 3012 can estimate that capability supported by the PD printer 1000 remains unchanged, the flow advances to step S45 to execute a normal process. If a response indicating other than "unprocessable by the printer" is received in step S43, the flow advances to step S44, and the DSC 3012 executes the "getCapability" to acquire capability supported by the PD printer 1000 at that time. In this way, the DSC 3012 can transmit "jobStart" set according to the capability supported by the PD printer 1000.

As described above, according to the first embodiment, in a case where it cannot be determined whether or not the printer 1000 supports a specific tag, the current operation of the printer 1000 is compared with the estimated operation to be made by the printer 1000 when the contents of that specific tag have a specific status value, and it can be determined by judging if the result matches, whether or not the printer 1000 supports the tag. As a result, an appropriate measure can be taken so as to prevent confusion.

Second Embodiment

In the first embodiment, the process associated with the capabilityChanged tag has been explained. In the second embodiment, a process associated with a disconnectEnable tag will be explained. This disconnectEnable tag is an option in both the DSC 3012 and PD printer 1000, and whether or not to support the tag is an arbitrary design item of each vendor. In the second embodiment, assume that the DSC 3012 has no command used to acquire whether or not the PD printer 1000 supports the disconnectEnable tag, contrary to the first embodiment. That is, a response script to the "getCapability" from the DSC 3012 to the PD printer 1000 does not include any information associated with disconnectEnable. The default value of this disconnectEnable is "False", and if the disconnectEnable tag is omitted in the "sendStatus" command, the disconnectEnable tag is considered as "False". The disconnectEnable tag has two status values "True" and "False". "True" indicates a state wherein no problem is posed even when connection between the DSC 3012 and PD printer 1000 via the USB cable is disconnected, and "False" indicates a state wherein a problem is posed if they are disconnected.

More specifically, after the DSC 3012 issues the "jobStart" command, the PD printer 1000 issues the "getimage" to acquire designated image files to be printed. If USB connection is disconnected before the PD printer 1000 acquires all image files, the print process requested by the "jobStart" can no longer be completed. That is, in this state, disconnectEnable should be "False". On the other hand, if the printer 1000 completes acquisition of all image files before completion of the print process, the print process requested by the "jobStart" can be completed even when the USB connection is disconnected. That is, in this state, disconnectEnable can be "True".

Under the aforementioned assumption, the DSC 3012 interprets the contents of the "sendstatus" transmitted from the PD printer 1000. As a result, even if the disconnectEnable tag indicates "False", the DSC 3012 cannot determine whether the PD printer 1000 actually supports the disconnectEnable tag and the disconnectEnable tag is "False" since a problem is posed if the USB connection is disconnected at that time, or whether the disconnectEnable tag is "False" since the PD printer 1000 does not support it. Hence, in such case, the DSC 3012 cannot determine whether a message "do not remove USB cable" or the like can be displayed for the user via the UI displayed on the display unit 2700.

Figure 30:
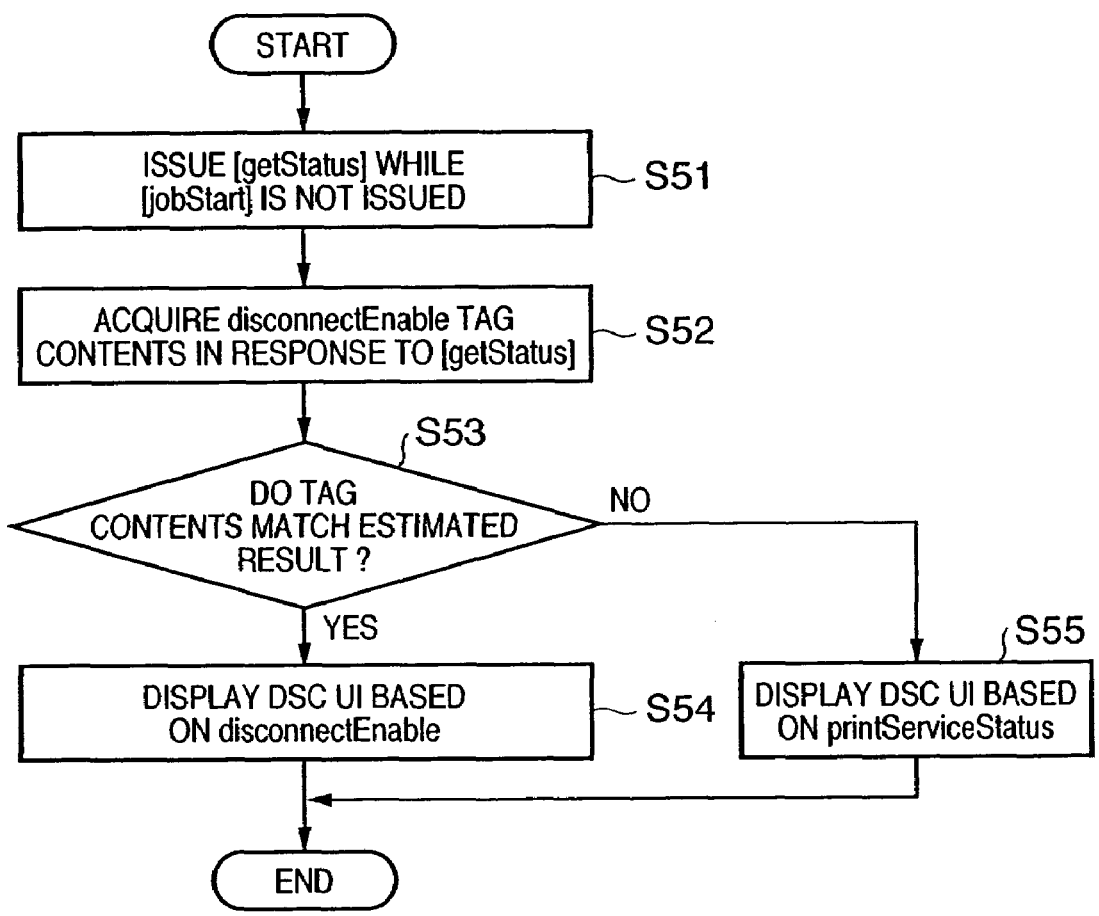
FIG. 30 is a flowchart for explaining the process in the DSC according to the second embodiment of the present invention.

FIG. 30 is a flowchart showing the process in the DSC 3012 in the second embodiment. A program for implementing the process is stored in the ROM 3101.

In step S51, the DSC 3012 issues the "getstatus" while the DSC 3012 does not issue the "jobStart", to acquire the latest status information of the PD printer 1000. The flow advances to step S52 to confirm the contents of disconnectEnable described in the acquired status information. Before the DSC 3012 issues the "jobStart", no problem is posed against the PD printer 1000 even when the USB connection is disconnected. Hence, if the PD printer 1000 supports the disconnectEnable tag, then it is estimated that the contents of the disconnectEnable tag should be "True". If the contents of the disconnectEnable tag are not "True" but "False", it is estimated that the PD printer 1000 does not support the disconnectEnable tag. Hence, in step S53, the contents of the acquired disconnectEnable tag are compared with the estimated contents. If they match, the flow advances to step S54, and the DSC 3012 sets a message to be displayed on the display unit 2700 in accordance with the contents of the disconnectEnable tag.

On the other hand, if a mismatch is found in step S53, the flow advances to step S55, and the DSC 3012 presents a message to be displayed on the display unit 2700 to the user in accordance with printServiceStatus in place of the contents of the disconnectEnable tag. For example, if the contents of the printServiceStatus tag indicate idle, the USB connection can be disconnected; if they indicate "printing" or "suspended", the USB connection cannot be disconnected.

As described above, according to the second embodiment, even when it cannot be determined based on "getCapability" or the like whether the PD printer 1000 actually supports a specific tag, the contents of an actually acquired tag are compared with estimated tag contents in a state wherein the contents of the tag can be estimated, and it can be determined by seeing if they match whether or not the PD printer supports the tag. In this manner, an appropriate UI can be displayed so as not to trouble the user.

Third Embodiment

In the third embodiment, a process between the DSC 3012 which supports jobEndReason and the printer 1000 which does not support it, will be described below. The jobEndReason tag is used to report the reason why a print job is ended, and the tag is an option in both the DSC 3012 and PD printer 1000. Whether or not this tag function is to be supported is an arbitrary design item of each vendor. In the third embodiment, assume that the DSC 3012 has no command for acquiring whether or not the PD printer 1000 supports the jobEndReason, as in the second embodiment. That is, a response script to "getCapability" does not include any information associated with the jobEndReason. The default value of the jobEndReason is "notEnded". If the jobEndReason tag is omitted in a "sendstatus" command, it is considered as "notEnded".

This jobEndReason tag can assume four status values: "notEnded" (job not ended), "endedNormally" (normally ended), "endedByJobAbort" (ended by an abort instruction), and "endedByprinterReason" (ended due to a printer reason). The "notEnded" indicates that a print job is not ended yet, and the "endedNormally" indicates that a print job is ended normally. The "endedByJobAbort" indicates that a print job is aborted by a "jobAbort" command from the DSC 3012, and the "endedByprinterReason" indicates that a print job is aborted by an operation at the PD printer 1000 (e.g., the user has pressed a print cancel button on the PD printer 1000, etc.).

More specifically, after the DSC 3012 issues the "jobStart" command, the PD printer 1000 executes a print job designated by the "jobStart". For example, assume that the DSC 3012 issues a print abort command (jobAbort) nearly simultaneously with completion of the print job. In this case, if the DSC 3012 can discriminate the end reason, i.e., if the print job is ended due to "jobAbort" or the print job is ended normally, the DSC 3012 can display the UI corresponding to the reason on the display unit 2700. If the print job is ended while the DSC 3012 does not issue any "jobAbort", and printServiceStatus shifts from "printing" to "idle", the DSC 3012 can display an appropriate UI, if the DSC 3012 can discriminate whether the print job is ended normally or is aborted due to the reason of the printer 1000.

On the other hand, if the DSC 3012 can not acquire the end reason of a print job, the DSC 3012 cannot determine whether or not a message "print is complete" or the like is to be displayed on the UI, in a case where the print job is ended and printServiceStatus shifts from "printing" to "idle". The third embodiment solves such problem.

Figure 31:
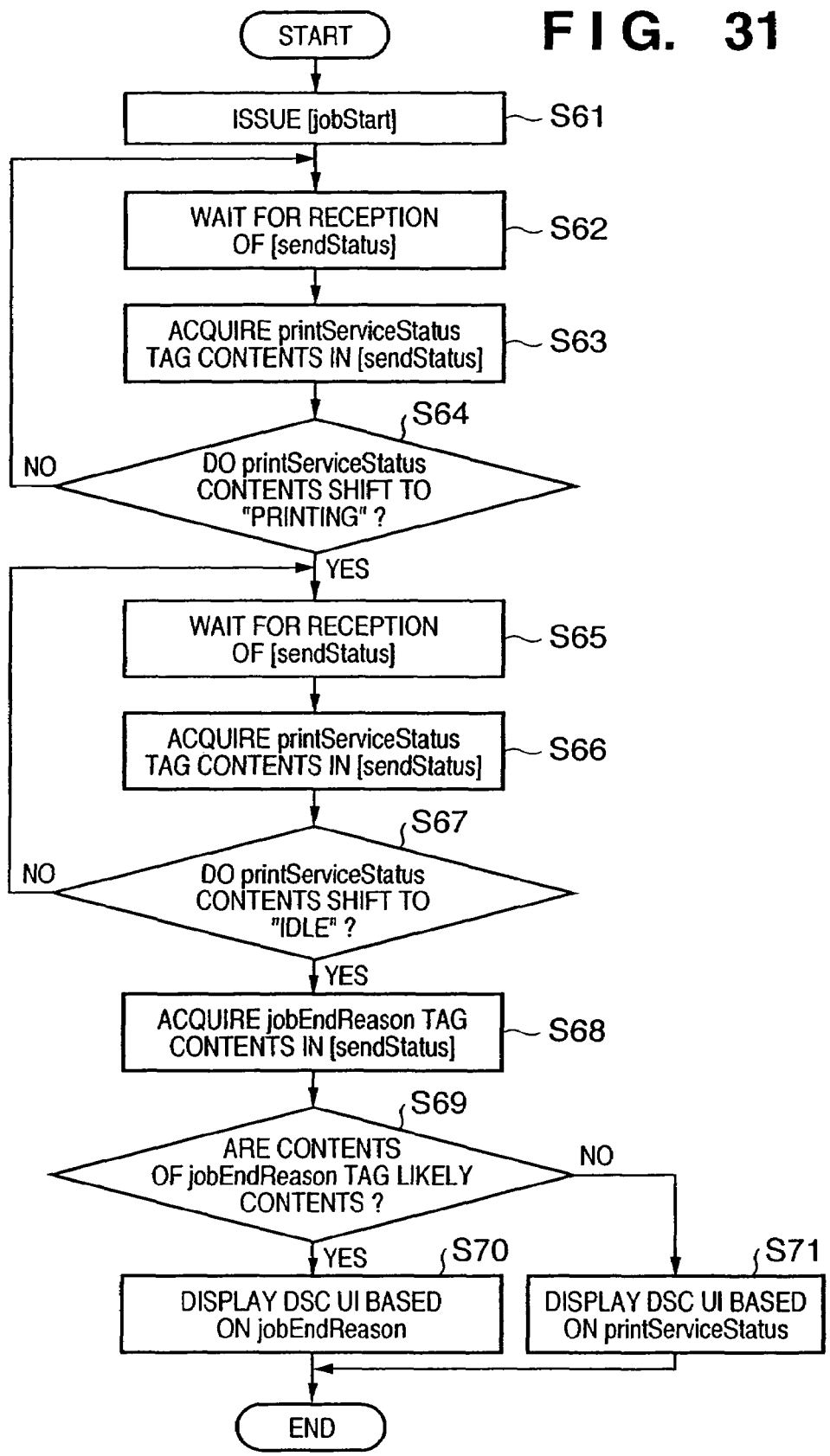
FIG. 31 is a flowchart for explaining the process in the DSC according to the third embodiment of the present invention.

FIG. 31 is a flowchart showing the process in the DSC 3012 according to the third embodiment of the present invention. A program for implementing this process is stored in the ROM 3101.

In step S61, the DSC 3012 issues the "jobStart". The flow advances to step S62, and the DSC 3012 waits for reception of the "sendStatus" transmitted from the PD printer 1000. The flow advances to step S63, and the DSC 3012 receives the "sendStatus" from the PD printer 1000 to acquire the contents of printServiceStatus. The flow advances to step S64 to check if the status of the PD printer 1000 that has started the print job shifts from "idle" to "printing". If printServiceStatus does not shift to "printing", the flow returns to step S62 to execute the aforementioned process.

If the status of the PD printer 1000 shifts to "printing" in step S64, the flow advances to step S65, and the DSC 3012 waits for reception of the "sendStatus" transmitted from the PD printer 1000. The flow then dvances to step S66, and the DSC 3012 receives the status from the PD printer and confirms the contents of printServiceStatus in the received "sendStatus". The flow advances to step S67 to check if the status of the PD printer 1000 that has ended the print job shifts to "idle" (wait state). If printServiceStatus does not shift to "idle", the flow returns to step S65.

If the status of the PD printer 1000 shifts to "idle" (wait state) in step S67, the flow advances to step S68 to acquire the contents of the jobEndReason tag when printServiceStatus is "idle". If the contents of printServiceStatus shift to "idle" after the DSC 3012 issued the "jobStart", it is estimated that the PD printer 1000 has surely ended the print job. Hence, if the PD printer 1000 supports the jobEndReason tag, it is estimated that the contents of the jobEndReason are other than "notEnded".

If the contents of jobEndReason are "notEnded", it is estimated that the PD printer 1000 does not support the jobEndReason tag. Hence, in step S69, the contents of jobEndReason are compared with unlikely estimated contents "notEnded". If likely estimated contents are found, the flow advances to step S70, and the DSC 3012 sets a message to be displayed on the display unit 2700 for the user in accordance with the contents of the jobEndReason tag.

On the other hand, if unlikely contents "notEnded" are found in step S69, the flow advances to step S71. In this case, the DSC 3012 displays another message to be displayed on the UI without setting it in accordance with the contents of the jobEndReason tag. For example, the DSC 3012 preferably sets a message in accordance with the contents of printServiceStatus: if the contents of the printServiceStatus tag shift to "idle", a message "print is complete" or the like is displayed without especially explaining a reason, and a restart menu or the like of an aborted print job is not displayed.

As described above, according to the third embodiment, even when it cannot be determined based on the "getCapability" or the like, whether the PD printer 1000 actually supports a specific tag, the contents of the tag which are actually acquired in a specific state wherein the contents of the tag can be estimated, are compared with the estimated tag contents to be set, and it can be determined by seeing if they match, whether or not the PD printer 1000 supports the tag function. In this manner, an appropriate UI can be displayed by the DSC 3012 without troubling the user.

Another Embodiment

In the embodiments, the DSC 3012 as the image supply device first requests function information of the printer, and exchanges each function information from each other. Alternatively, the PD printer first as the image printing device requests function information of the DSC 3012 as the image supply device from the printer 1000, and exchanges each function information from each other.

The objects of the present invention can also be achieved by supplying a storage medium, which records a program code of a software program to the system or apparatus, and reading out and executing the program code stored in the storage medium by a computer (or a CPU or MPU) of the system or apparatus. In this case, the program code itself read out from the storage medium implements the functions of the above-mentioned embodiments, and the storage medium which stores the program code constitutes the present invention. As the storage medium for supplying the program code, for example, a Floppy® disk, hard disk, optical disk, magneto-optical disk, CD-ROM, CD-R, magnetic tape, nonvolatile memory card, ROM, and the like may be used.

The functions of the above-mentioned embodiments may be implemented not only by executing the readout program code by the computer but also by some or all of actual processing operations executed by an OS (operating system) running on the computer on the basis of an instruction of the program code.

Furthermore, the functions of the above-mentioned embodiments may be implemented by some or all of actual processing operations executed by a CPU or the like arranged in a function extension board or a function extension unit, which is inserted in or connected to the computer, after the program code read out from the storage medium is written in a memory of the extension board or unit.

The present invention is not limited to the above embodiments and various changes and modifications can be made within the spirit and scope of the present invention. Therefore, to apprise the public of the scope of the present invention, the following claims are made.

CLAIM OF PRIORITY

This application claims priority from Japanese Patent Application No. 2003-290599 filed on Aug. 8, 2003, which is hereby incorporated by reference herein.

What is claimed is:

1. A recording apparatus for communicating with an image supply device using a predetermined protocol, comprising:
    a communication unit constructed to communicate with the image supply device in accordance with a communication procedure of the predetermined protocol;
    a capability transmission unit constructed to transmit capability information of the recording apparatus to the image supply device upon establishing communication with the image supply device by the communication unit;
    a capability changed information transmission unit constructed to transmit capability changed information for indicating that a capability of the recording apparatus has changed, when the capability of the recording apparatus has changed;
    a new capability transmission unit constructed to transmit new capability information of the recording apparatus after transmitting the capability changed information by the capability changed information transmission unit;
    an estimation unit constructed to estimate whether or not the image supply device has a function corresponding to the capability changed information, in a case that the recording apparatus can not obtain information indicating whether or not the image supply device has the function corresponding to the capability changed information; and
    a control unit constructed to (i) cause the new capability transmission unit to transmit the new capability information of the recording apparatus to the image supply device without breaking communication with the image supply device if the estimation unit estimates that the image supply device has the function corresponding to the capability changed information, and (ii) to cause the communication unit to break communication with the image supply device and then to cause said communication unit to establish communication with the image supply device again and to cause the capability transmission unit to transmit the capability information of the recording apparatus to the image supply device, if the estimation unit estimates that the image supply device does not have the function corresponding to the capability changed information and the capability of the recording apparatus has changed.

2. The apparatus according to claim 1, wherein the estimation unit estimates whether or not the image supply device has the function corresponding to the capability changed information based on a recording job received from the image supply device after transmitting the capability changed information to the image supply device, or based on whether or not a request for capability information is received from the image supply device after transmitting the capability changed information to the image supply device.

3. The apparatus according to claim 1, further wherein the estimation unit estimates whether or not the image supply device has the function corresponding to the capability changed information based on a command received from the image supply device after the capability changed information transmission unit transmits the capability changed information to the image supply device.

4. The apparatus according to claim 1, wherein the estimation unit estimates whether or not the image supply device has the function corresponding to the capability changed information based on whether a request for capability information is received from the image supply device after transmitting the capability changed information to the image supply device.

5. The apparatus according to claim 1, wherein the communication unit communicates using a USB protocol, wherein the recording apparatus is a USB host and the image supply device is a USB device, and wherein the image supply device does not have the function corresponding to the capability changed information.

6. An image supply apparatus for communicating with a recording apparatus using a predetermined protocol, comprising:
    a reception unit constructed to receive capability information of the recording apparatus from the recording apparatus upon establishing communication with the recording apparatus in accordance with the predetermined protocol;
    an estimation unit constructed to estimate whether or not the recording apparatus has a function for sending capability changed information which indicates that a capability of the recording apparatus has changed, based on information communicated with the recording apparatus, in a case that the image supply apparatus can not obtain information indicating whether or not the recording apparatus has the function for sending capability changed information; and
    a control unit constructed to receive the capability changed information from the recording apparatus without breaking communication with the recording apparatus if the estimation unit estimates that the recording apparatus has the function for sending the capability changed information, or to break the communication with the recording apparatus and then to establish communication with the recording apparatus again, if the estimation unit estimates that the recording apparatus does not have the function for sending the capability changed information, such that the capability information of the recording apparatus is received from the recording apparatus upon establishing the communication with the recording apparatus again.

7. The apparatus according to claim 6, wherein the estimation unit estimates whether or not the recording apparatus has the function for sending capability changed information based on a command received by the reception unit.

8. The apparatus according to claim 6, wherein the estimation unit estimates whether or not the recording apparatus has the function for sending capability changed information based on information received by said reception unit, in a case that the capability information does not include data regarding the capability changed information.

9. A control method of a recording apparatus for communicating with an image supply device using a predetermined protocol, the method comprising:
- a communication step of communicating with the image supply device in accordance with a communication procedure of the predetermined protocol;
- a capability transmission step of transmitting capability information of the recording apparatus to the image supply device upon establishing communication with the image supply device in the communication step;
- a capability changed information transmission step of transmitting capability changed information for indicating that a capability of the recording apparatus has changed when the capability of the recording apparatus has changed;
- a new capability transmission step of transmitting new capability information of the recording apparatus after transmitting the capability changed information in the capability changed information transmission step;
- an estimation step of estimating whether or not the image supply device has a function corresponding to the capability changed information, in a case that the recording apparatus can not obtain information indicating whether or not the image supply device has the function corresponding to the capability changed information; and
- a control step of (i) transmitting the new capability information to the image supply device without breaking communication with the image supply device if it is estimated in the estimation step that the image supply device has the function corresponding to the capability changed information, and of (ii) breaking the communication with the image supply device and then establishing the communication with the image supply device again, if it is estimated in the estimation step that the image supply device does not have the function corresponding to the capability changed information and the capability of the recording apparatus has changed, such that the capability information of the recording apparatus is transmitted to the image supply device upon establishing the communication with the image supply device again.

10. The method according to claim 9, wherein the estimation step estimates whether or not the image supply device has the function coffesponding to the capability changed information based on a recording job received from the image supply device after transmitting the capability changed information to the image supply device.

11. The method according to claim 9,
wherein the estimation step estimates whether or not the image supply device has the function corresponding to the capability changed information based on a command received from the image supply device after the capability changed information is transmitted to the image supply device in the capability changed information transmission step.

12. The method according to claim 9, wherein the estimation step estimates whether or not the image supply device has the function corresponding to the capability changed information based on whether a request for capability information is received from the image supply device after transmitting the capability changed information to the image supply device.

13. The method according to claim 9, wherein the communication step communicates using a USB protocol, wherein the recording apparatus is a USB host and the image supply device is a USB device, and wherein the image supply device does not have the function corresponding to the capability changed information.

14. A control method of an image supply apparatus for communicating with a recording apparatus using a predetermined protocol, the method comprising:
- a reception step of receiving capability information of the recording apparatus from the recording apparatus upon establishing communication with the recording apparatus in accordance with the predetermined protocol;
- an estimation step of estimating whether or not the recording apparatus has a function for sending capability changed information which indicates that a capability of the recording apparatus has changed, based on information communicated with the recording apparatus, in a case that the image supply apparatus can not obtain information indicating whether or not the recording apparatus has the function for sending capability changed information; and
- a control step of receiving the capability changed information from the recording apparatus without breaking communication with the recording apparatus if it is estimated in the estimation step that the recording apparatus has the function for sending the capability changed information, or breaking communication with the recording apparatus and then establishing communication with the recording apparatus again, if it is estimated in the estimation step that the recording apparatus does not have the function for sending the capability changed information, such that the capability information of the recording apparatus is received from the recording apparatus upon establishing the communication with the recording apparatus again.

15. The method according to claim 14, wherein the estimation step estimates whether or not the recording apparatus has the function for sending the capability changed information based on a command received in the reception step.

16. The method according to claim 14, wherein the estimation step estimates whether or not the recording apparatus has the function for sending the capability changed information based on information received in the reception step, in a case that the capability information does not include data regarding the capability changed information.

* * * * *